(12) United States Patent
Jung et al.

(10) Patent No.: US 11,890,569 B2
(45) Date of Patent: Feb. 6, 2024

(54) AIR CLEANER

(71) Applicant: LG ELECTRONICS INC., Seoul (KR)

(72) Inventors: Soonki Jung, Seoul (KR); Hyunpil Ha, Seoul (KR); Yeongcheol Mun, Seoul (KR); Jaekyun Park, Seoul (KR); Soohyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/749,557

(22) Filed: May 20, 2022

(65) Prior Publication Data

US 2022/0274042 A1 Sep. 1, 2022

Related U.S. Application Data

(63) Continuation of application No. 15/623,781, filed on Jun. 15, 2017, now Pat. No. 11,364,459.

(30) Foreign Application Priority Data

Jun. 15, 2016 (KR) ........................ 10-2016-0074360
Mar. 23, 2017 (KR) ........................ 10-2017-0036711

(51) Int. Cl.
*B01D 46/24* (2006.01)
*F24F 13/28* (2006.01)
(Continued)

(52) U.S. Cl.
CPC ......... *B01D 46/24* (2013.01); *B01D 46/0004* (2013.01); *B01D 46/0005* (2013.01);
(Continued)

(58) Field of Classification Search
None
See application file for complete search history.

(56) References Cited

U.S. PATENT DOCUMENTS 3,016,984 A * 1/1962 Getzin .................. B01D 46/24
55/501
3,595,398 A * 7/1971 Cook .................... B01D 35/30
210/462

(Continued)

FOREIGN PATENT DOCUMENTS

CN 1561253 1/2005
CN 1584428 2/2005
(Continued)

OTHER PUBLICATIONS

European Search Report dated Oct. 17, 2017.
(Continued)

*Primary Examiner* — Brit E. Anbacht
(74) *Attorney, Agent, or Firm* — KED & ASSOCIATES

(57) ABSTRACT

An air cleaner is provided that may include a main body having at least one cylindrical filter and at least one filter frame that forms a mounting space for the at least one filter; and a cylindrical case coupled to an outside of the main body, the cylindrical case having at least one suction inlet through which air is suctioned toward the at least one filter, so that air may be suctioned in 360-degree directions. If the cylindrical case is opened, the at least one filter may be extracted to the outside in a radial direction from the mounting space, thereby facilitating attachment/detachment of the at least one filter.

17 Claims, 17 Drawing Sheets

(51) Int. Cl.
　　　B01D 46/00　　　　(2022.01)
　　　B01D 46/56　　　　(2022.01)
　　　F24F 8/108　　　　(2021.01)
(52) U.S. Cl.
　　　CPC .......... B01D 46/2411 (2013.01); B01D 46/56
　　　　(2022.01); F24F 13/28 (2013.01); *B01D*
　　　　*2265/023* (2013.01); *B01D 2265/06* (2013.01);
　　　　*F24F 8/108* (2021.01); *Y02A 50/20* (2018.01)

(56) References Cited

U.S. PATENT DOCUMENTS

| | | | | |
|---|---|---|---|---|
| 4,189,054 | A | * | 2/1980 | Liu ...................... A47G 21/001 220/4.23 |
| 4,468,321 | A | * | 8/1984 | St. John ................ B01D 29/96 210/474 |
| 4,477,270 | A | * | 10/1984 | Tauch ................ B01D 46/0036 55/318 |
| 4,629,482 | A | * | 12/1986 | Davis ................ B01D 46/0031 55/385.2 |
| 4,655,805 | A | * | 4/1987 | Krantz .................. B01D 50/20 55/497 |
| 5,266,090 | A | * | 11/1993 | Burnett ................ B01D 46/10 96/135 |
| 5,290,330 | A | * | 3/1994 | Tepper .................. B01D 46/60 55/385.2 |
| 5,410,896 | A | * | 5/1995 | Gleason ................ B60R 25/066 109/34 |
| 5,435,817 | A | * | 7/1995 | Davis ...................... F24F 8/10 96/204 |
| 5,512,086 | A | * | 4/1996 | Glucksman ............ F24F 8/108 55/497 |
| 5,641,343 | A | * | 6/1997 | Frey .................... B01D 46/521 55/330 |
| 6,050,774 | A | | 4/2000 | LeBaron |
| 7,217,098 | B2 | * | 5/2007 | Lim ........................ F04D 17/04 416/100 |
| 8,419,818 | B2 | * | 4/2013 | Page ................ B01D 46/0005 55/497 |
| 9,821,259 | B2 | * | 11/2017 | Bae ........................ F24F 3/16 |
| 9,827,523 | B2 | * | 11/2017 | Park .................... B01D 46/60 |
| 9,914,082 | B2 | * | 3/2018 | Park ...................... F24F 8/10 |
| 9,943,794 | B2 | * | 4/2018 | Jung .................... B01D 46/60 |
| 9,950,289 | B2 | * | 4/2018 | Jung .................... B01D 46/60 |
| 10,323,855 | B2 | * | 6/2019 | Jung .................. B01D 46/0008 |
| 10,436,469 | B2 | * | 10/2019 | Mun .................. B01D 46/2403 |
| 10,495,104 | B2 | * | 12/2019 | Park .......................... F24F 8/80 |
| 10,518,205 | B2 | * | 12/2019 | Mun .................. B01D 46/2403 |
| 10,654,725 | B2 | * | 5/2020 | Dani ...................... C02F 1/283 |
| 2002/0096596 | A1 | | 7/2002 | Adelakun |
| 2004/0098959 | A1 | | 5/2004 | Guilliard |
| 2006/0254229 | A1 | | 11/2006 | Schrage et al. |
| 2006/0277875 | A1 | | 12/2006 | Schuld |
| 2007/0080081 | A1 | * | 4/2007 | Chang ...................... A61L 2/10 206/362 |
| 2007/0221061 | A1 | | 9/2007 | Steiner |
| 2010/0064895 | A1 | | 3/2010 | Thurin |
| 2010/0192768 | A1 | | 8/2010 | Kim |
| 2011/0236628 | A1 | | 9/2011 | Soukhojak |
| 2011/0259199 | A1 | * | 10/2011 | Blossey ................ B01D 46/009 96/417 |
| 2011/0265647 | A1 | | 11/2011 | Find |
| 2012/0012080 | A1 | | 1/2012 | Dong |
| 2012/0122389 | A1 | | 5/2012 | Kishimoto |
| 2013/0092798 | A1 | * | 4/2013 | Boyce .................... F02C 7/052 29/888.011 |
| 2014/0020561 | A1 | | 1/2014 | Aery |
| 2014/0208704 | A1 | | 7/2014 | Hill |
| 2015/0231542 | A1 | | 8/2015 | Wennerstrom |
| 2015/0273381 | A1 | * | 10/2015 | Stoner, Jr. ............ B01D 46/62 96/418 |
| 2015/0290572 | A1 | * | 10/2015 | Stoner, Jr. .......... B01D 46/4254 55/504 |
| 2016/0030871 | A1 | | 2/2016 | Krause |
| 2016/0074801 | A1 | | 3/2016 | Francis |
| 2016/0184753 | A1 | | 6/2016 | Chu |
| 2017/0035262 | A1 | | 2/2017 | Li |
| 2017/0056796 | A1 | | 3/2017 | Narvaez |
| 2017/0122596 | A1 | | 5/2017 | Lee |
| 2017/0144093 | A1 | | 5/2017 | Neri |
| 2017/0361260 | A1 | * | 12/2017 | Campbell .......... B01D 46/2411 |
| 2018/0207568 | A1 | | 7/2018 | Jung |
| 2018/0347130 | A1 | | 12/2018 | Lu |
| 2019/0107302 | A1 | | 4/2019 | Liu |
| 2019/0128545 | A1 | | 5/2019 | Horng |
| 2019/0168160 | A1 | | 6/2019 | Huen |
| 2019/0170162 | A1 | * | 6/2019 | Jennings ................ F04D 19/002 |
| 2019/0224582 | A1 | | 7/2019 | Fernandez |
| 2019/0331137 | A1 | | 10/2019 | Xiao |
| 2019/0365074 | A1 | | 12/2019 | Kikuchi |
| 2019/0368774 | A1 | | 12/2019 | Chen |
| 2020/0069077 | A1 | * | 3/2020 | Jain .......................... A47F 3/02 |
| 2020/0085262 | A1 | | 3/2020 | Youn |
| 2020/0158357 | A1 | | 5/2020 | Son |
| 2021/0372658 | A1 | | 12/2021 | Jang |

FOREIGN PATENT DOCUMENTS

| | | | |
|---|---|---|---|
| CN | 2679567 | | 2/2005 |
| CN | 1652859 | | 8/2005 |
| CN | 1684621 | | 10/2005 |
| CN | 101105308 | | 1/2008 |
| CN | 103277847 | | 9/2013 |
| CN | 104422035 | | 3/2015 |
| CN | 204730341 | | 10/2015 |
| CN | 204865318 | | 12/2015 |
| CN | 105333528 | | 2/2016 |
| CN | 106139754 | | 11/2016 |
| CN | 106839139 | | 6/2017 |
| CN | 206739465 U | * | 12/2017 |
| DE | 4438198 | | 5/1995 |
| EP | 0 631 987 | | 1/1995 |
| EP | 2 853 835 | | 4/2015 |
| EP | 2853835 | | 12/2015 |
| EP | 2853835 A3 | * | 12/2015 ......... B01D 46/0064 |
| JP | 2000-354724 | | 12/2000 |
| JP | 2014-119224 | | 6/2014 |
| KR | 10-0139487 | | 6/1998 |
| KR | 20-0342073 | | 2/2004 |
| KR | 10-2004-0056151 | | 6/2004 |
| KR | 10-0508312 | | 8/2005 |
| KR | 10-0936811 | | 1/2010 |
| KR | 10-2010-0056797 | | 5/2010 |
| KR | 10-2012-0071992 | | 7/2012 |
| KR | 10-1342606 | | 12/2013 |
| KR | 10-2014-0015945 | | 2/2014 |
| KR | 10-2016-0012796 | | 2/2016 |
| KR | 10-2016-0015084 | | 2/2016 |
| KR | 10-2016-0048499 | | 5/2016 |
| KR | 10-2016-0053646 | | 5/2016 |
| KR | 10-2016-0054731 | | 5/2016 |
| WO | WO 97/10475 | | 3/1997 |
| WO | WO 2015/052036 | | 4/2015 |
| WO | WO-2017102008 A1 | * | 6/2017 ......... B01D 46/0005 |

OTHER PUBLICATIONS

Korean Office Action dated Jul. 20, 2018.
Chinese Office Action dated Mar. 4, 2019 with English Translation.
Korean Office Action dated Mar. 28, 2019.
Korean Notice of Allowance dated May 9, 2019.
U.S. Office Action issued in U.S. Appl. No. 15/623,871 dated Aug. 10, 2020.
Chinese Office Action dated Jan. 29, 2021.
Chinese Office Action dated Mar. 11, 2021.
Chinese Office Action issued in Application No. 201911252987.5 dated Apr. 19, 2021.
U.S. Final Office Action issued in U.S. Appl. No. 15/623,871 dated Jun. 11, 2021.
Chinese Notice of Allowance dated Sep. 28, 2021.
Chinese Notice of Allowance dated Nov. 24, 2021.

(56) References Cited

OTHER PUBLICATIONS

Korean Office Action issued in Application No. 10-2019-0096377 dated Feb. 18, 2022.
Chinese Notice of Allowance issued in Application No. 201910654621.4 dated Feb. 18, 2022.
U.S. Notice of Allowance issued in U.S. Appl. No. 15/623,871 dated Feb. 22, 2022.
Matthew Kramer, "Envion Adds Mini Therapure Air Purifiers", HomeWorld Business, Sep. 3 Aug. 3, 2020 https://web.archive.org/web/20200803234051/https://www.honneworldbusiness.conn/envion-adds-mini-therapure-air-purifiers/ (Year: 2013).
Korean Office Action dated Dec. 23, 2022 issued in KR Application No. 10-2019-0096377.
Korean Notice of Allowance dated May 26, 2023.

\* cited by examiner

AIR CLEANER

CROSS-REFERENCE TO RELATED APPLICATIONS

This application is a Continuation Applications of prior U.S. patent application Ser. No. 15/623,781 filed Jun. 15, 2017, which claims priority under 35 U.S.C. § 119 to Korean Application Nos. 10-2016-0074360, filed in Korea on Jun. 15, 2016 and 10-2017-0036711, filed in Korea on Mar. 23, 2017, which are hereby incorporated by reference in its entirety.

BACKGROUND

1. Field

An air cleaner is disclosed herein.

2. Background

An air cleaner is a device that supplies and purifies contaminated air and then discharges purified air. For example, the air cleaner may include a blower which introduces outside air into an inside of the air cleaner and a filter which is capable of filtering dust, and bacteria, for example, in air.

Generally, the air cleaner is configured to purify an indoor space, such as a home or an office. According to the related art air cleaner, there is a problem that a capacity thereof is limited, and thus, purification of air in an entire indoor space is limited. Accordingly, air around the air cleaner is capable of being purified whereas air in a space which is away from the air cleaner is not easily purified.

In order to solve this problem, there are efforts to improve a performance of a fan provided in the air cleaner. However, noise which is generated by the fan gradually increases as a blowing amount of the fan increases. Accordingly, there is a problem that a reliability of the product is decreased. Also, there is inconvenience in that the air cleaner has to be moved by a user in order to purify air in a desired space.

With regard to the related art air cleaner, the present applicant disclosed and published, Korean Publication No. KR10-2012-0071992 (hereinafter referred to as "prior art document"), published on Jul. 3, 2012 and entitled "AIR CLEANER", which is hereby incorporated by reference. According to the prior art document, air cleaning components, such as the fan and a filter inside of a case having a substantially rectangular parallelepiped shape, are installed in a main body of the air cleaner. Air suction ports are formed on or at a side portion and a lower portion of the main body of the air cleaner and an air discharge port is formed on or at an upper portion of the main body thereof.

According to this configuration, there is a problem in that a suction capacity becomes smaller as contaminated air is suctioned from a limited direction, that is, from a sideways direction and a downward direction relative to the air cleaner. A corner portion of the case having a rectangular parallelepiped shape acts as a structural resistance interfering with the suction of air.

In addition, there is a problem in that an air cleaning function is limited as the purified air does not flow to a space which is away from the air cleaner, whereas air around the air cleaner is capable of being purified as the air which is purified in the inside portion of the air cleaner is discharged only in one direction, that is, only in an upward direction. Further, there is a problem in that a blowing capacity is limited as only one blowing fan is provided in the main body of the air cleaner.

BRIEF DESCRIPTION OF THE DRAWINGS

Embodiments will be described in detail with reference to the following drawings in which like reference numerals refer to like elements, and wherein.

DETAILED DESCRIPTION

Figure 1:
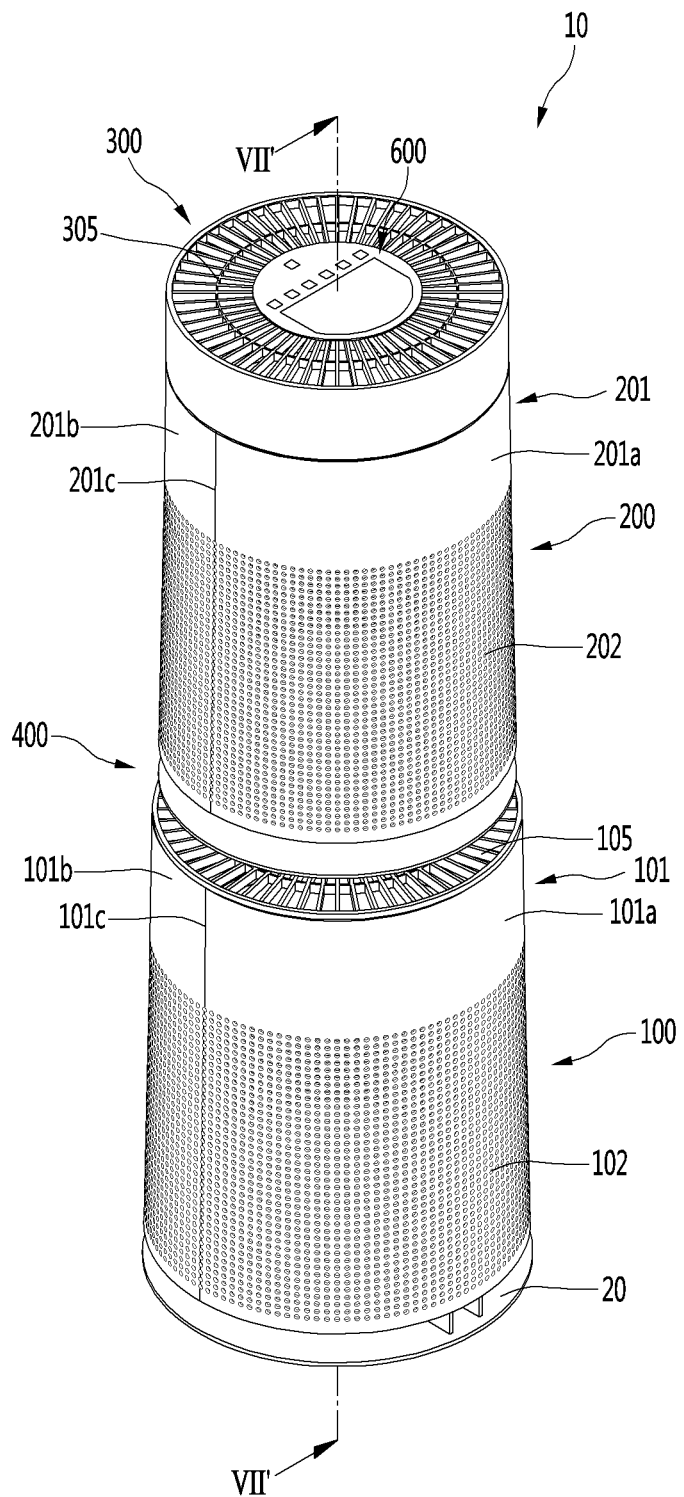
FIG. 1 is a perspective view illustrating an outer appearance of an air cleaner according to an embodiment.

Hereinafter, embodiments will be described with reference to the illustrative drawings. Regarding the reference numerals assigned to the components in the drawings, it should be noted that the same components may be designated by the same reference numerals, wherever possible, even though they are shown in different drawings. Also, in the description of embodiments, specific description of known related configuration or functions may be omitted when it is deemed that such description may cause ambiguous interpretation of the present disclosure.

Also, in the description of embodiments, terms such as first, second, A, B, (a), (b) or the like may be used herein when describing components. Each of these terminologies is not used to define an essence, order or sequence of a corresponding component but used merely to distinguish the corresponding component from other component(s). In a case where it is described that any component is "connected" or "coupled" to another component, the component may be directly or indirectly connected or coupled to another component. However, it is to be understood that another component may be "connected" or "coupled" between the components.

Figure 2:
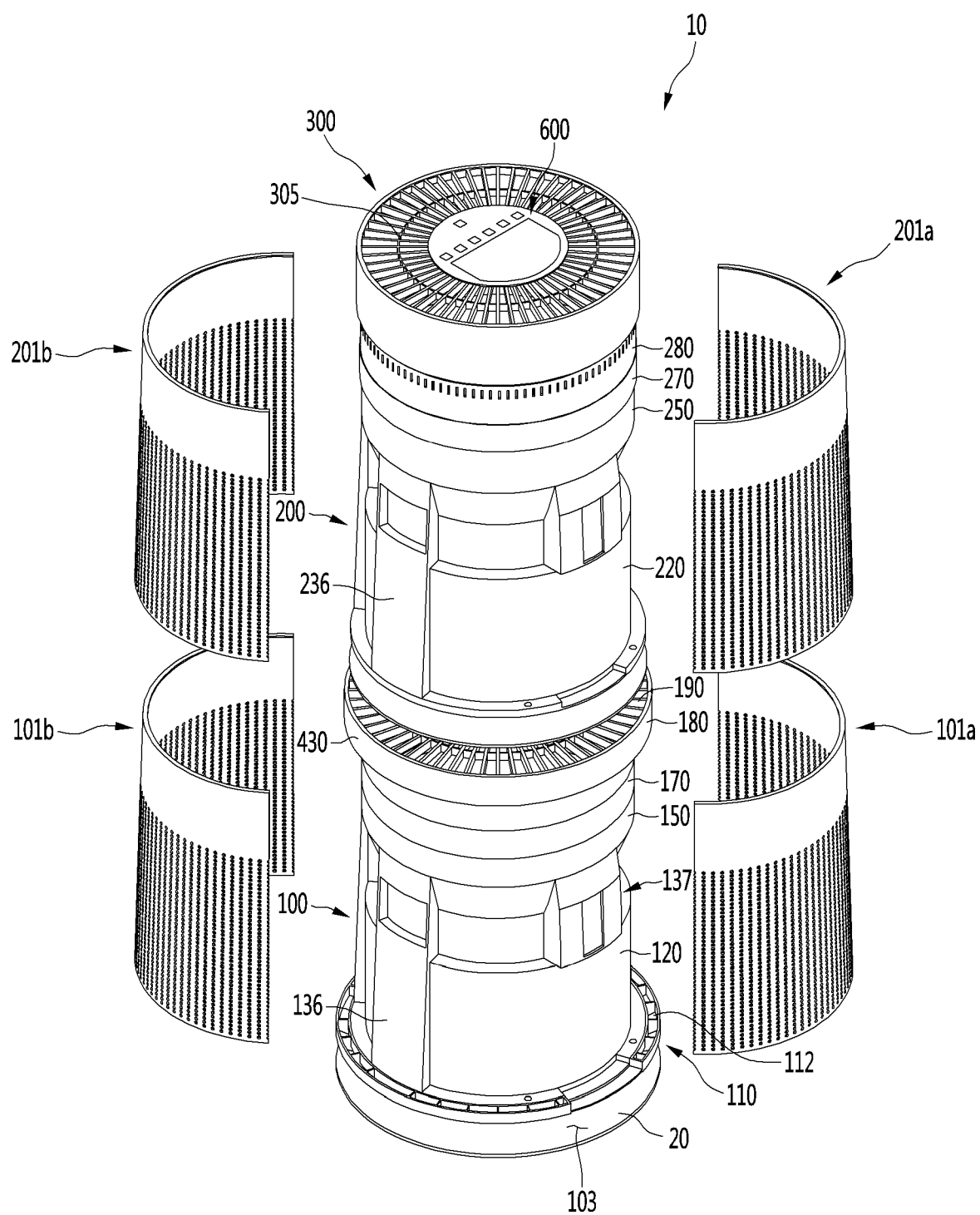
FIG. 2 is an exploded perspective view of the air cleaner according to an embodiment.

FIG. 1 is a perspective view illustrating an outer appearance of an air cleaner according to an embodiment. FIG. 2 is an exploded perspective view of the air cleaner according to an embodiment.

Referring to FIGS. 1 and 2, the air cleaner 10 according to an embodiment may include blowing devices or blowers 100 and 200 that generate air flow and an air flow control device or controller 300 which changes a discharge direction of the air flow generated in the blowers 100 and 200. The blowers 100 and 200 may include a first blowing device or blower 100 that generates a first air flow and a second blowing device or blower 200 that generates a second air flow.

The first blower 100 and the second blower 200 may be disposed in a vertical direction. For example, the second blower 200 may be disposed on or at an upper side of the first blower 100. In this case, the first air flow may form a flow of indoor air suctioned in or at a lower side of the air cleaner 10 and the second air flow may form a flow of indoor air suctioned in or at an upper side of the air cleaner 10.

The first blower 100 and the second blower 200 may be referred to as a "first air cleaning module" or "first air cleaner" and a "second air cleaning module" or "second air cleaner", respectively, in that the first blower 100 and the second blower 200 perform a function of cleaning the air in a cleaning space. The first blower 100 may be referred to as "lower air cleaning module" or "lower module" in that the first blower 100 may be disposed or provided on or at a lower portion of the air cleaner 10 and the second blower 200 may be referred to as "upper air cleaning module" or "upper module" in that the second blower 200 may be disposed or provided on or at an upper portion of the air cleaner 10. The air flow controller 300 may be referred to as an "air flow control module 300".

The air cleaner 10 may include cases 101 and 201 which form an outer appearance thereof. The cases 101 and 201 may include a first case 101 which forms an outer appearance of the first blower 100. The first case 101 may be understood as a part that covers a first main body portion or body 100a (see FIG. 3) of the first blower 100. In other words, the first blower 100 may include the first main body 100a and the first case 101 which covers the main body portion 100a. For example, the first main body 100a may include a first filter member or filter 120, a first filter frame 130, a first fan 160, a first fan housing 150, first and second air guide devices or guides 170 and 180, for example, which will be described hereinafter.

The first case 101 may have a cylindrical shape. An upper portion of the first case 101 may have a diameter which is smaller than a diameter of a lower portion thereof. That is, the first case 101 may have a truncated cone shape.

The first case 101 may include two parts 101a and 101b that form the first case 101. The two parts 101a and 101b may include a first part 101a and a second part 101b. The first and second part 101a and 101b may have a same shape.

The first case 101 may further include a separation portion 101c by which the first and second parts 101a and 101b may be assembly or disassembled. The separation portion 101c may form side end portions or ends of the first part 101a or side end portions or ends of the second part 101b. The first and second parts 101a and 101b may be supported by a suction grill 110, which will be described hereinafter, to be coupled to each other.

The first part 101a or the second part 101b may be separated from each other in a radial direction of the air cleaner 10, and accordingly, the first case 101 may be opened. When the first case 101 is opened, the first main body 100a of the first blower 100 may be replaced or repaired.

The first case 101 may include a first suction portion or inlet 102 through which air may be suctioned in the radial direction thereof. The first suction inlet 102 may include a through hole which may be formed to pass through at least a portion of the first case 101. A plurality of first suction inlets 102 may be provided. The first suction inlet 102 may be formed at each of the first and second parts 101a and 101b.

The plurality of first suction inlets 102 may be evenly spaced in a circumferential direction along an outer circumferential surface of the first case 101 so that air suctioning may be performed in any direction relative to the first case 101. That is, air may be suctioned in 360-degree directions relative to a center line in the vertical direction which passes through an inside center of the first case 101.

Accordingly, a suctioned amount of air may be increased by the first case 101 having a cylindrical shape and the plurality of first suction inlets 102 being formed along the outer circumferential surface of the first case 101. A flow resistance to suctioned air may be reduced by avoiding a cube shape having edge portions or edges such as the case of the related art air cleaner.

Among the plurality of through holes, a size of a through hole formed in a lower part or portion of the first suction inlet 102 (hereinafter, referred to as a "lower through hole") may be formed larger than a size of a through hole formed at an upper part or portion of the first suction inlet 102 (hereinafter, referred to as an "upper through hole"). As the first fan 160 may be disposed or provided at the upper portion of the first suction inlet 102, the size of the lower through hole located relatively distant from the first fan 160 may be relatively increased, so that suctioned of air may be smoothly performed through the plurality of through holes.

Air which is suctioned through the first suction inlet 102 may flow substantially in the radial direction from the outer circumferential surface of the first case 101. Directions will be defined. Relative to the FIG. 1, the vertical direction may refer to an axial direction and a transverse direction may refer to the radial direction. The axial direction may correspond to a central axial direction of the first fan 160 and a second fan 260, which is described hereinafter, that is, a motor shaft direction of the fan. The radial direction may be understood as a direction which is perpendicular to the axial direction. A circumferential direction may refer to a virtual circle direction, which is formed by rotating about the axial direction and having a distance in the radial direction as a rotational radius.

The first blower 100 may include a base 20 which may be provided in or at a lower side of the first case 101 and placed on the ground. The base 20 may be spaced apart from a lower end portion or end of the first case 101 in a downward direction. A base suction portion or inlet 103 may be formed in a separation space between the first case 101 and the base 20.

Air which is suctioned through the base suction inlet 103 may flow in an upward direction through a suction portion or inlet 112 of the suction grill 110 (see FIG. 2), which may be provided in or at an upper side of the base 20. In other words, the first blower 100 may include a plurality of suction inlets 102 and 103. Air existing in a lower portion of an indoor space may be easily introduced into the first blower 100 through the plurality of suction inlets 102 and 103. Accordingly, the suctioned amount of air may be increased.

A first discharge portion or outlet 105 may be formed on or at an upper portion of the first blower 100. The first discharge outlet 105 may be formed on a first discharge grill 195 of a first discharge guide device or guide 190 (see, FIG. 10), which may be provided in the first blower 100. The first discharge guide 190 may form an outer appearance of an upper end portion or end of the first blower 100. Air which is discharged through the first discharge outlet 105 may flow to an upper side in the axial direction.

The cases 101 and 201 may include a second case 201 which forms an outer appearance of the second blower 200. The second case 201 may be understood as a part that covers a main body portion or body of the second blower 200. In other words, the second blower 200 may include the second case 201. For example, the main body may include a second filter member or filter 220, a second filter frame 230, a second fan 260, a second fan housing 250, a third air guide device or guide 270, and a second discharge guide device or guide 280, for example, which will be described hereinafter.

The second case 201 may have a cylindrical shape. In addition, an upper part or portion of the second case 201 may be configured to have a diameter smaller than a diameter of a lower part or portion of the second case 201. That is, the second case 201 may have a truncated cone shape.

The second case 201 may include two parts 201a and 201b that form the second case 201. The two parts 201a and 201b may include a first part 201a and a second part 201b. The first and second parts 201a and 201b may have a same shape.

The second case 201 may further include a separation portion 201c by which the first and second parts 201a and 201b may be assembled or disassembled. The separation portion 201c may form side end portions or ends of the first part 201a or side end portions or ends of the second part 201b. The first and second parts 201a and 201b may be supported by a lever supporting device or support 560 to be coupled to each other.

The first part 201a or the second part 201b may be separated from each other in the radial direction of the air cleaner 10, and accordingly, the second case 201 may be opened. When the second case 201 is opened, a second main body portion or body of the second blower 200 may be replaced or repaired.

The diameter of the lower end portion or end of the second case 201 may be formed to be smaller than the diameter of the upper end portion or end of the first case 101. Accordingly, in a general shape of the cases 101 and 201, a lower cross-sectional area of the cases 101 and 102 may be formed to be greater than an upper cross-sectional area. Accordingly, the air cleaner 10 may be stably supported on the ground.

The second case 201 may include a second suction portion or inlet 202 through which air may be suctioned. The second suction inlet 202 may include a through hole which may pass through at least a portion of the second case 201. A plurality of second suction inlets 202 may be provided. The second suction inlet 202 may be formed at each of the first and second parts 201a and 201b.

The plurality of second suction inlets 202 may be evenly spaced in the circumferential direction along an outer circumferential surface of the second case 201 so that air suctioning may be performed in any direction relative to the second case 201. In other words, air may be suctioned in 360-degree directions relative to a center line in the vertical direction which passes through an inside center of the second case 201.

Accordingly, a suctioned amount of air may be increased by the second case 201 having a cylindrical shape and the plurality of second suction inlets 202 being formed along the outer circumferential surface of the second case 201. A flow resistance to suctioned air may be reduced by avoiding a cube shape having edge portions or edges such as the case of the related art air cleaner.

Among the plurality of through holes, a size of a through hole formed at a lower part or portion of the second suction inlet 202 (hereinafter, referred to as a "lower through hole") may be formed larger than a size of a through hole formed at an upper part or portion of the second suction inlet 202 (hereinafter, referred to as an "upper through hole"). As the second fan 260 may be disposed or provided at the upper portion of the second suction inlet 202, the size of the lower through hole located relatively distant from the second fan 260 may be relatively increased, so that suctioning of air may be smoothly performed through the plurality of through holes. Air which is suctioned in through the second suction inlet 202 may flow substantially in the radial direction from the outer circumferential surface of the second case 201.

Any one of the two parts that form the first case 101 or the second case 201 may have a semi-cylindrical shape or a semi-cone shape, that is, a shape corresponding to ½ of a truncated cone shape. If two parts having the shape are coupled to each other, the first case 101 or the second case 201 having a cylindrical shape of a cone shape, that is, a truncated cone shape, may be configured.

The air cleaner 10 may include a dividing device or divider 400 which may be provided between the first blower 100 and the second blower 200. The divider 400 may include a dividing plate 430 that separates or blocks air flow generated in the first blower 100 and air flow generated in the second blower 200. By the dividing plate 430, the first and second blower 100 and 200 may be disposed to be spaced apart from each other in the vertical direction.

The air flow controller 300 may be installed or provided on or at an upper side of the second blower 200. An air flow path of the second blower 100 may communicate with an air flow path of the air flow controller 300. The air passing through the second blower 100 may be discharged through a second discharge portion or outlet 305 to the outside via the air flow path of the air flow controller 300. The second discharge outlet 305 may be formed on or at an upper end portion or end of the air flow controller 300.

Figure 17:
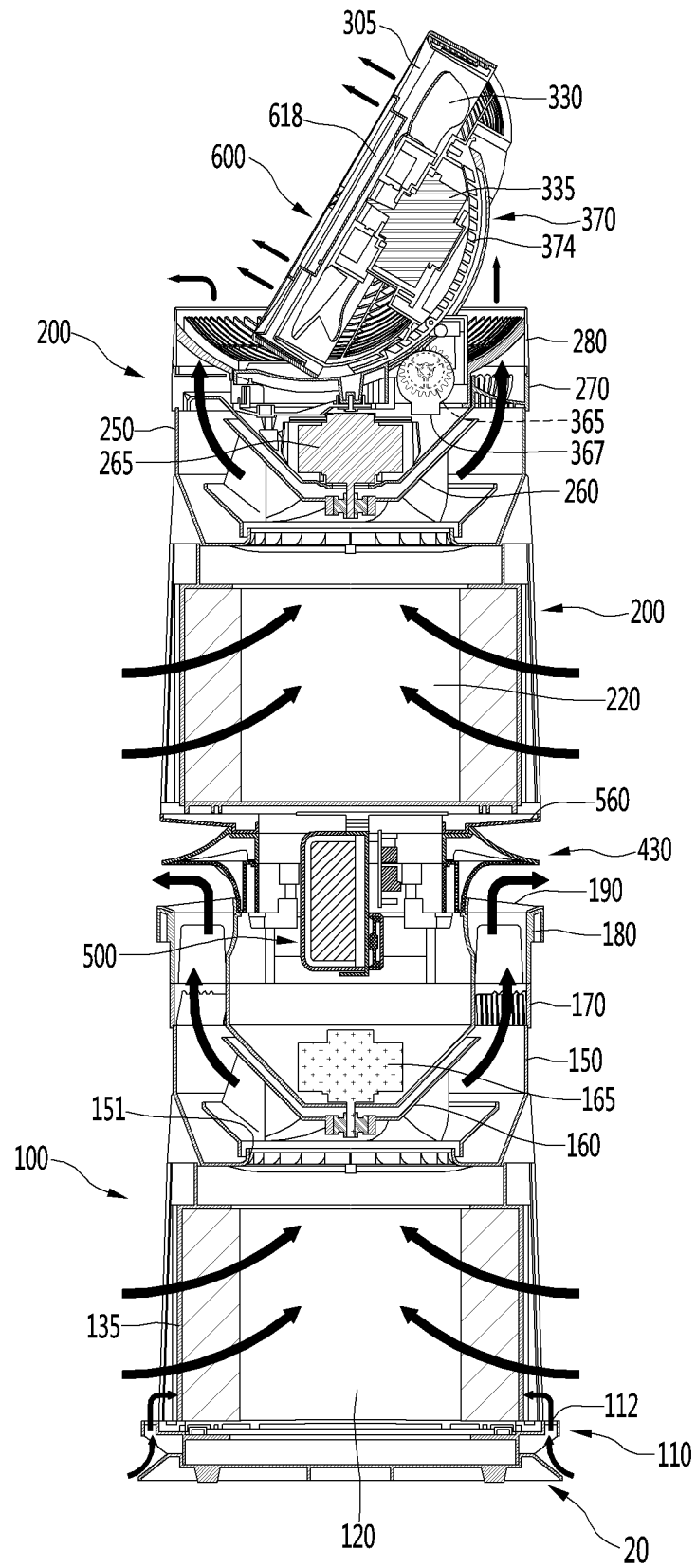

The air flow controller 300 may be movable. The air flow controller 300 may be positioned in a laid-out state (first position), as illustrated in FIG. 1, or in an inclinedly erected state (second position), as illustrated in FIG. 17.

In addition, a display device or display 600 that displays operation information of the air cleaner 10 may be provided at an upper portion of the air flow controller 300. The display 600 may be movable together with the air flow controller 300.

Figure 3:
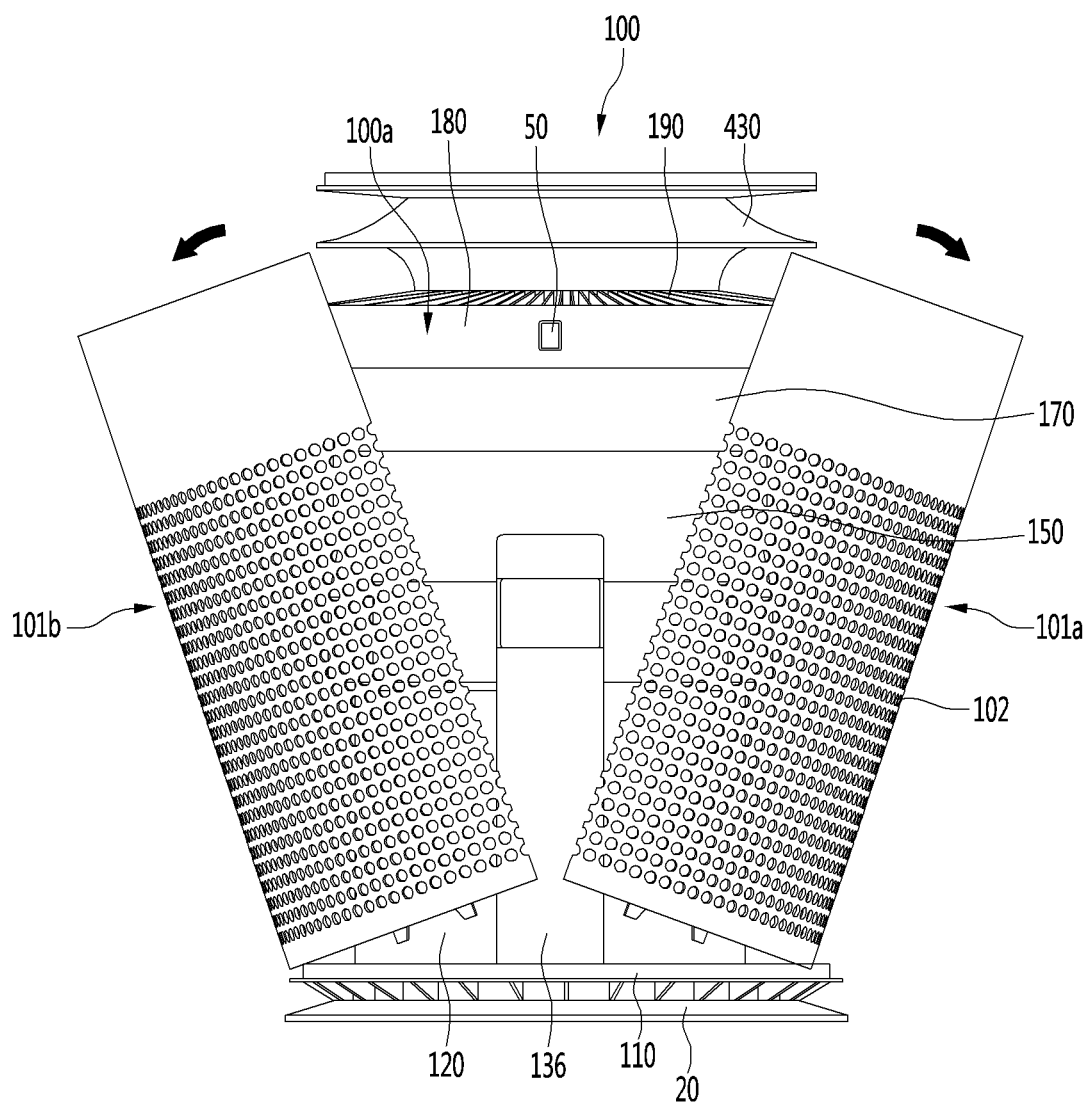
FIG. 3 is a view illustrating a state in which a case is separated from a main body of an air cleaning module according to an embodiment.
Figure 4:
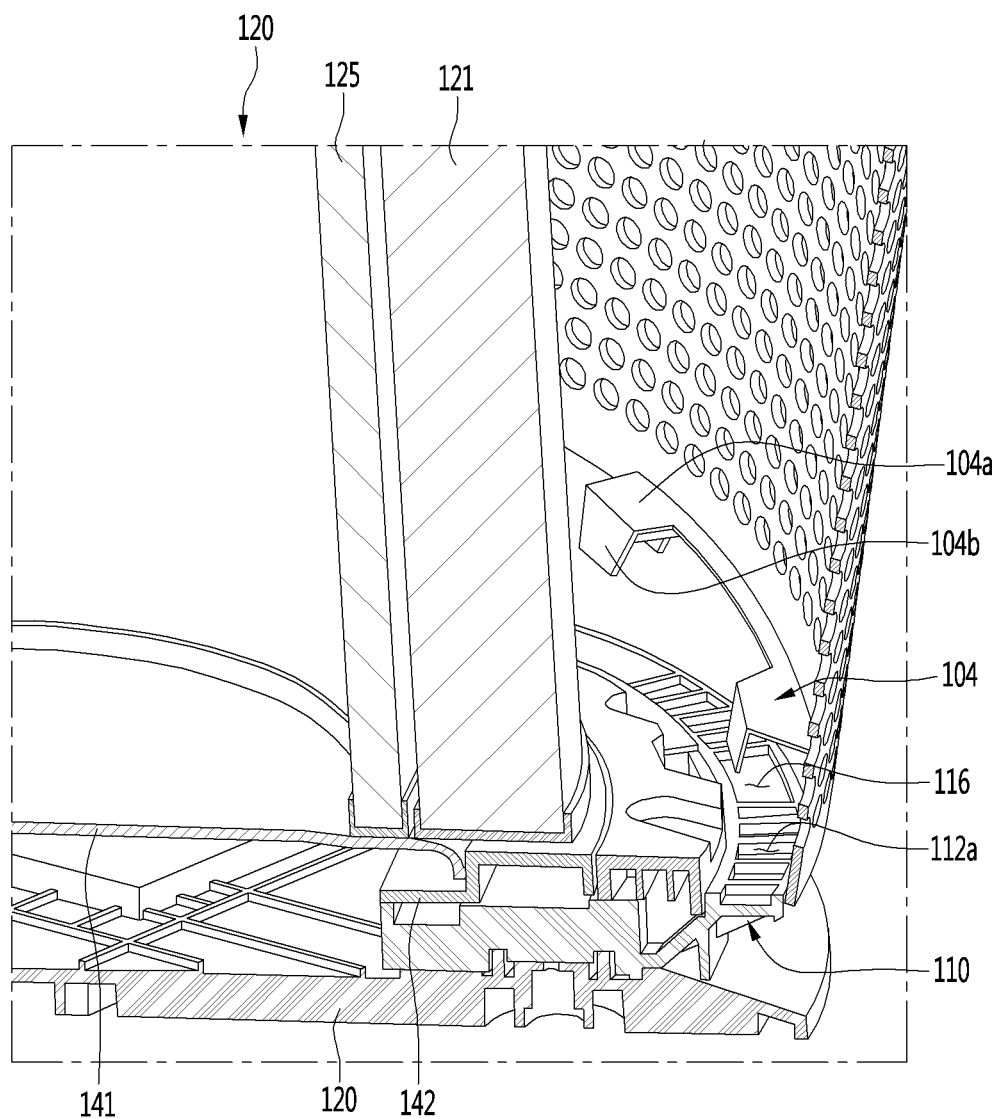
FIG. 4 is a sectional view illustrating a supporting structure of the case according to an embodiment.
Figure 5:
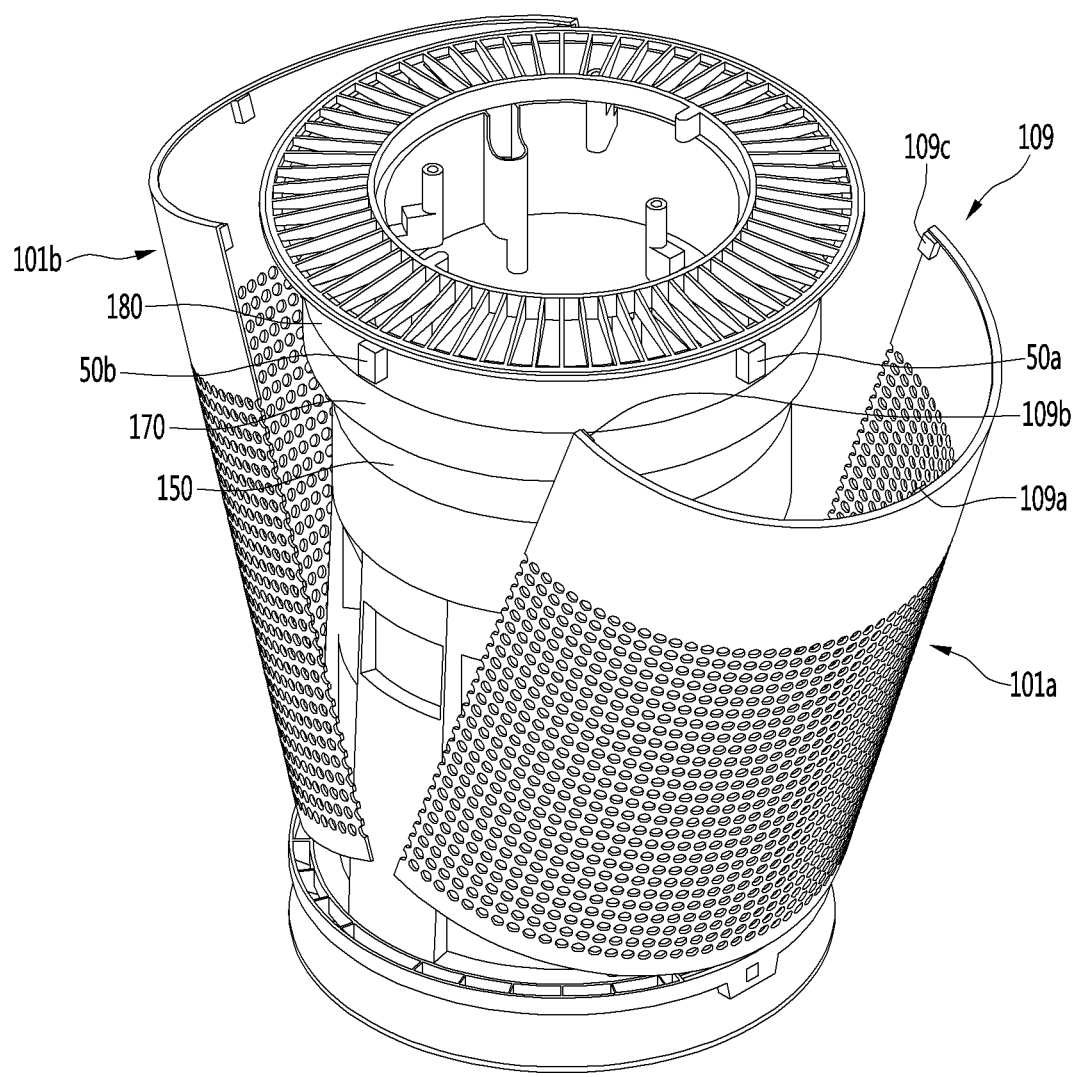
FIG. 5 is a view illustrating a coupling structure of the case and a first main body according to an embodiment.
Figure 6:
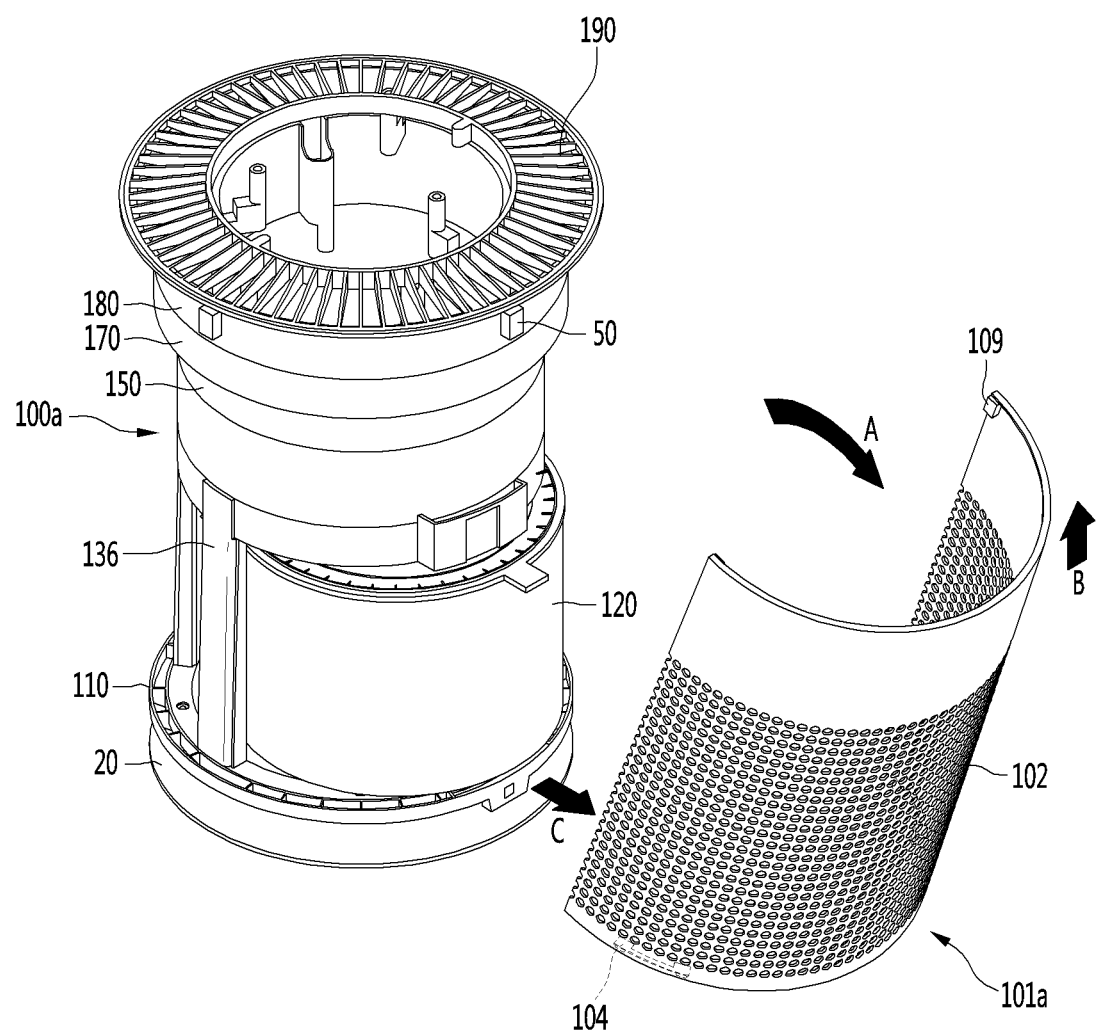
FIG. 6 is a view illustrating a state in which the case is separated from the first main body and a first filter is extracted.

FIG. 3 is a view illustrating a state in which a case is separated from a main body of an air cleaning module according to an embodiment. FIG. 4 is a sectional view illustrating a supporting structure of the case according to an embodiment. FIG. 5 is a view illustrating a coupling structure of the case and a first main body according to an embodiment. FIG. 6 is a view illustrating a state in which the case is separated from the first main body and a first filter is extracted.

Referring to FIGS. 3 and 6, the case 101 or 201 according to an embodiment may include a supporting device or support and a main body coupling device. The support may be provided at the lower portion of the case 101 or 201, and the main body coupling device may be provided at the upper portion of the case 101 or 201. FIGS. 3 to 6 illustrate a support and a main body coupling device of the first case 101, and these devices may be identically applied to the second case 201.

The first case 101 may be separated from the first main body 100a as the upper portion of the first case 101 is opened (or rotated) outwards in a state in which the lower portion of the first case 101 is supported. The first case 101 may include the first part 101a and the second part 101b, which cover both sides of the first main body 100a of the first blower 100.

Each of the first part 101a and the second part 101b may be separably coupled to the first main body 100a. A configuration in which the first part 101a is supported and coupled to the first main body 100a may be identical to a configuration in which the second part 101b is supported and coupled to the first main body 100a. Therefore, hereinafter, the first part 101a will be mainly described.

The first part 101a may include a supporting device or support supported by the suction grill 110. The support may include a support projection 104 provided at the first part 101a and may be coupled to a grill insertion portion 116 of the suction grill 110. The support projection 104 may be located at the lower portion of the first part 101a and protrude from an inner circumferential surface of the first part 101a.

The support projection 104 may include a first projection extension portion or extension 104a that extends in the radial direction from the inner circumferential surface of the first part 101a and a second projection extension portion or extension 104b that extends downwardly from the first projection extension 104a. According to the configuration of the first and second projection extensions 104a and 104b, the support projection 104 may have a shape that protrudes from the inner circumferential surface of the first part 101a and is then bent downwardly.

The grill insertion portion 116 may be formed as at least one portion of a rim portion or rim 111a of the suction grill 110 and may vertically pass therethrough. Also, the grill insertion portion 116 may be disposed or provided at the suction inlet 112 of the suction grill 110. The suction inlet 112 may include a plurality of suction holes 112a, and the grill insertion portion 116 may be formed between the plurality of suction holes 112a. For example, a size of the grill insertion portion 116 may be formed larger than a size of each suction hole 112a, and the grill insertion portion 116 may be configured to have a size to an extent where the support projection 104 is inserted into the grill insertion portion 116.

A plurality of the support projection 104 may be provided. The plurality of support projections 104 may be disposed or provided at the inner circumferential surface of the first part 101a to be spaced apart from each other, and may be arranged in the circumferential direction. As the plurality of support projections 104 are provided, the first part 101a may be stably supported by the suction grill 110. The suction grill 110 may be referred to as a "case support portion" or "case support" in that the first case 101 may be supported by the suction grill 110.

The first filter 120 may be disposed or provided inside of the first case 101. In other words, the first and second part 101a and 101b may surround the first filter 120. Therefore, if the first case 101 is separated from the first main body 100a of the first blower 100, the filter 120 may be in a state in which it may be extracted to the outside.

The first filter 120 may include a plurality of filter portions 121 and 125. The plurality of filter portions 121 and 125 include a first filter portion 121 and a second filter portion 125. The second filter portion 125 may be inserted into the first filter portion 121. In addition, each of the first and second filter portions 121 and 125 may have a hollow cylindrical shape.

The first filter portion 121 may be understood as a "foreign substance removing filter" that filters fine dust or microorganisms, such as viruses, in the air. For example, the first filter portion 121 may include a HEPA filter. In addition, the second filter portion 125 may include a "deodorizing filter" that filters odor particles in the air.

Referring to FIG. 5, the first case 101 according to an embodiment may include a main body coupling device coupled to the first main body 100a of the first blower 100. The main body coupling device may include a metal piece 109. For example, the metal piece 109 may include steel coupled to a magnet. Also, the metal piece 109 may be provided at the upper portion of the first case 101.

The metal piece 109 may be disposed or provided at the inner circumferential surface of the first part 101a. A plurality of the metal piece 109 may be provided, and the plurality of metal pieces 109 may be arranged in the circumferential direction to be spaced apart from each other. For example, the plurality of metal pieces 109 may include a first metal piece 109a, a second metal piece 109b, and a third metal piece 109c.

A magnet member or magnet 50 coupled to the metal piece 109 may be provided at an outer circumferential surface of the first main body 100a. The magnet 50 may be disposed or provided at an upper part or portion of the first main body 100a. For example, the magnet 50 may be provided at an outer circumferential surface of the second air guide 180.

A plurality of the magnet 50 may be provided, and the plurality of magnets 50 may be arranged in the circumferential direction to be spaced apart from each other. For example, the plurality of magnets 50 may include a first magnet 50a coupled to the first metal piece 109a, a second magnet 50b coupled to the second metal piece 109b, and a third magnet (not shown) coupled to the third metal piece 109c. As described above, the plurality of metal pieces 109 and the plurality of magnets 50 may be coupled to each other, so that the first case 201 may be stably coupled to the first main body 100a of the first blower 100.

Another embodiment will be discussed hereinafter. In the above-described embodiment, it has been described that the metal piece disposed or provided at the first case 101 and the magnet disposed or provided at the first main body 100a interact with each other. Alternatively, the magnet disposed or provided at the first case 101 and the metal piece disposed or provided at the first main body 100a may interact with each other.

Attachment/detachment of the first case 101 and attachment/detachment of the first filter 120 will be briefly described with reference to FIG. 6. In a state in which the first case 101 is coupled to the outside of the first main body 100a, the lower portion of the first case 101 is supported at an upper side of the suction grill 110. That is, the support projection 104 of the first case 101 is in a state in which it is inserted into the grill insertion portion 116 of the suction grill 110. In addition, the metal piece 109 provided at the upper portion of the first case 101 is in a state in which it is coupled to the magnet 50 of the first main body 100a by a magnetic force of the magnet 50. According to the above-described configuration, the first case 101 may be stably coupled to the first main body 100a.

In order to expose the first filter 120 to the outside, the first case 101 may be separated from the first main body 100a. First, as shown in FIG. 3, the first case 101 may be rotated by pulling the upper portion of the first case 101 so as to release the coupling between the metal piece 109 and the magnet 50 (direction A). At this time, the lower portion of the first case 101 is maintained in a state in which it is supported by the suction grill 110, and accordingly, a user may easily separate the metal piece 109 and the magnet 50 from each other without much effort.

If the upper portion of the first case 101 is spaced apart from the upper portion of the first main body 100a, the user upwardly lifts the first case 101 such that the support projection 104 is separated from the grill insertion portion 116 (direction B). In such a manner, if the first case 101 is separated from the first main body 100a, the first filter 120 is exposed to the outside, and is located at a position at which the first filter 120 is to be separated from the first filter frame 130 (see FIG. 8). The user may separate the first filter 120 from the first blower 100 by grasping the first filter 120 and then pulling the first filter 120 to the outside in the radial direction (direction C).

According to above-described operations of the first case 101 and the first filter 120, opening of the first blower 100 and attachment/detachment of the first filter 120 may be easily performed.

Figure 7:
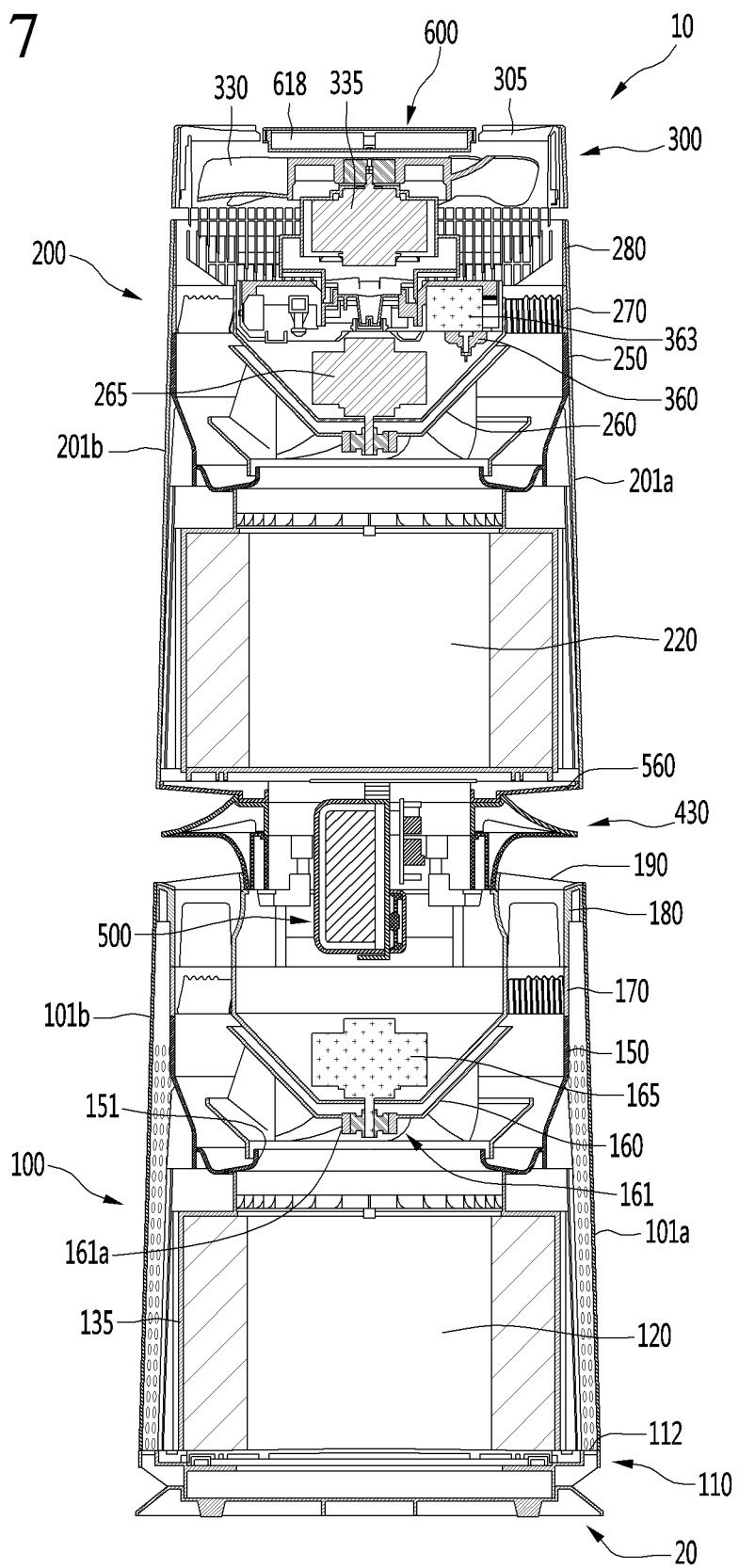
FIG. 7 is a sectional view, taken along line VII-VII' of FIG. 1.
Figure 8:
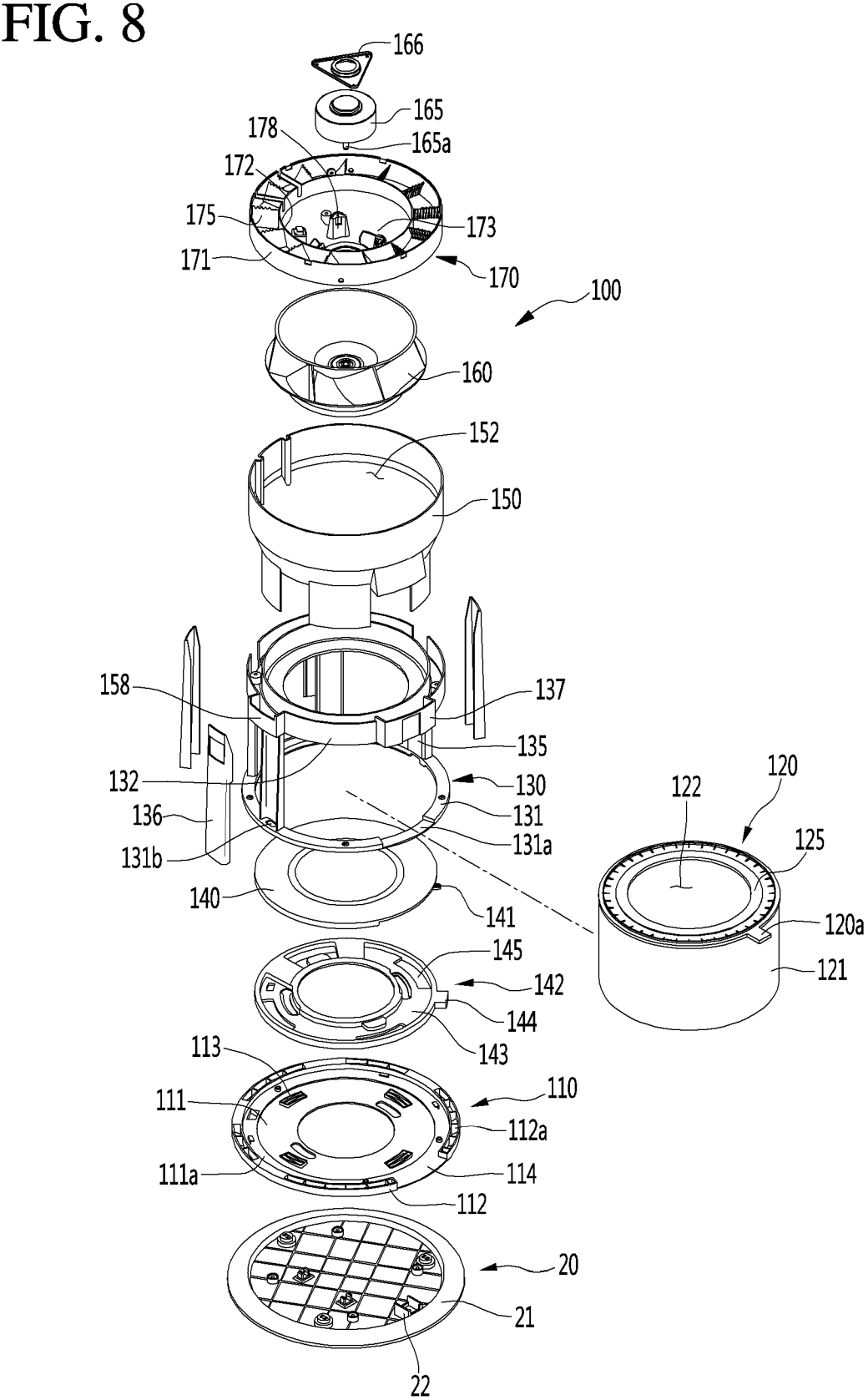
FIG. 8 is an exploded perspective view of a first blower according to an embodiment.

FIG. 7 is a sectional view, taken along line VII-VII of FIG. 1. FIG. 8 is an exploded perspective view of a first blower according to an embodiment.

Referring to FIGS. 7 and 8, the first blower 100 according to an embodiment may include the base 20 and the suction grill 110 disposed or provided at an upper side of the base 20. The base 20 may include a base main body 21 placed on a ground and a base protrusion portion or protrusion 22 that protrudes upwardly from the base main body 21 to allow the suction grill 110 to be placed thereon. The base protrusion portion 22 may be provided at each of both sides of the base 20.

The base main body 21 and the suction grill 110 may be spaced apart from each other by the base protrusion 22. The base suction inlet 103 which forms a suction space for air may be formed between the base 20 and the suction grill 110.

The suction grill 110 may include a grill main body 111 having a substantially ring shape and the rim 111a that protrudes upwardly from an outer circumferential surface of the grill main body 111. According to the configuration of the grill main body 111 and the rim 111a, the suction grill 110 may have a stepped structure.

The suction grill 110 may include the suction inlet 112 formed at the rim 111a. The suction inlet 112 may protrude upwardly along a circumference of the rim 111a, and be configured to extend in the circumferential direction. In addition, the plurality of suction holes 112a may be formed inside of the suction inlet 112. The plurality of suction holes 112a may communicate with the base suction inlet 103.

Air suctioned through the plurality of suction holes 112a and the base suction inlet 103 may pass through the first filter 120. The first filter 120 may be formed in a cylindrical shape, and have a filter surface that filters air. The air passing through the plurality of suction holes 112a may be introduced into the first filter 120 by passing through an outer circumferential surface of the first filter 120.

The suction grill 110 may further include a movement guide portion or guide 113 that protrudes upwardly from an upper surface of the grill main body 111 to guide upward or downward movement of the first filter 120. The movement guide 113 may have a shape that gradually protrudes in the circumferential direction from the upper surface of the grill main body 111. That is, the movement guide 113 may have an inclined surface that protrudes in the circumferential direction.

A plurality of the movement guide 113 may be provided spaced apart from each other in the circumferential direction. For example, as shown in FIG. 8, four movement guides 113 may be provided. However, the number of movement guides 113 is not limited thereto.

The grill main body 111 may further include a groove portion or groove 114 that provides a space in which a second handle 144, which will be described hereinafter, may be movable. The groove 114 may form at least a portion of the grill main body 111, and may be understood as an inlet at which the suction inlet 112 is not formed in the rim portion 111a of the grill main body 111.

The first blower 100 may include a lever device or lever 142 which may be provided at an upper side of the suction grill 110 and be manipulated by a user. The lever 142 may be rotatable in the circumferential direction.

The lever device 142 may include a lever main body 143 which may have a substantially ring shape and be rotatable. In addition, a plurality of cut-out portions or cutouts 145 respectively disposed or provided at positions corresponding to the plurality of movement guides 113 may be formed in the lever main body 143. The plurality of cut-outs 145 may be understood as through holes formed in the lever main body 143.

The plurality of cut-outs 145 may be spaced apart from each other, to be arranged in the circumferential direction of the lever main body 143. In addition, each cut-out 145 may be formed rounded to have a predetermined curvature in the circumferential direction, corresponding to a curvature of an outer circumferential surface of the lever main body 143.

The lever 142 may be supported by the upper surface of the grill main body 111. If the lever 142 is supported by the grill main body 111, the plurality of movement guides 113 may be inserted into the plurality of cut-outs 145, respectively. The plurality of movement guides 113 may protrude to upper sides of the plurality of cut-outs 145 by passing through the plurality of cut-outs 145, respectively. The second handle 144 may be provided at the outer circumferential surface of the lever main body 143.

A supporting device or support 140 that supports the first filter 120 may be provided at an upper side of the lever 142. The support 140 may include a first handle 141 coupled to the second handle 144. The user may rotate the lever main body 143 and the support 140 clockwise or counterclockwise by grasping the first and second handles 141 and 144.

The lever 142 may support a lower surface of the support 140. The support 140 may be provided with a support protrusion portion (not shown), which may be in contact with the movement guide 113. The support protrusion may protrude downwardly from the lower surface of the support 140, and be provided at a position corresponding to the movement guide 113. In addition, a shape of the support protrusion may correspond to a shape of the movement guide 113, and include an inclined surface that gradually protrudes in the circumferential direction.

A direction in which the movement guide 113 gradually protrudes and a direction in which the support protrusion gradually protrudes may be opposite to each other. For example, if the direction in which the movement guide 113 gradually protrudes is a counterclockwise direction, the direction in which the support protrusion gradually protrudes may be a clockwise direction.

The lever 142 and the support 140 may be rotated together. In this rotation process, the movement guide 113 and the support protrusion may interfere with each other. If a lower part or portion of the support protrusion is in contact with an upper part or portion of the movement guide 113, the lever 142, and the support 140 may be moved upwardly. In addition, the first filter 120 supported by the support 140 is in a state in which the first filter 120 is coupled to the first blower 100 while moving upwardly.

On the other hand, if an upper part or portion of the support protrusion is in contact with a lower part or portion of the movement guide 113 or if interference between the support protrusion and the movement guide 113 is released, the lever 142 and the support 140 may be moved downwardly. In addition, the first filter 120 supported by the support 140 is in a state in which the first filter 120 is separable (releasable) from the first blower 100.

The first filter 120 may have a cylindrical shape having an open upper part or portion. The first filter 120 may include a filter main body (first and second filter portions) 121 and 125 having a cylindrical filter portion an inside of which may be empty and a filter hole 122 formed to be opened at an upper end part or portion of the filter main body 121 and 125.

A filter grasping portion or grasp 120a may be provided at an upper part or portion or lower part or portion of the filter main body 121 and 125. Air may be introduced into the filter main body 121 and 125 through an outer circumferential surface of the filter main body 121 and 125, and be discharged from the first filter 120 through the filter hole 122. The filter main body 121 and 125 may include the first filter portion 121 and the second filter portion 125 inserted into the first filter portion 121.

The first blower 100 may further include the first filter frame 130 which may form a mounting space for the first filter 120. The first filter frame 130 may include a first frame 131 which forms a lower part or portion of the first filter frame 130 and a second frame 132 which forms an upper part or portion of the first filter frame 130.

The first frame 131 may include a frame recessed portion or recess 131a having a shape which is recessed downwardly. The frame recess 131a may be configured such that at least a portion of the first frame 131 is recessed. The frame recess 131a may be formed at a position corresponding to the groove 114 of the suction grill 110. The groove 114 and the frame recess 131a may provide a space at or in which the first and second handles 141 and 144 may be movable.

In addition, a holding portion 131b coupled to a holding projection of the first case 101 may be formed at the first frame 131. The holding portion 131b may be formed at an outside of a first filter supporting portion or support 135.

The second frame 132 may be upwardly spaced apart from the first frame 131. The second frame 132 may have a substantially ring shape. A ring-shaped internal space of the second frame 132 may form at least a portion of an air flow path that passes through the first filter frame 130. In addition, an upper part or portion of the second frame 132 may support the first fan housing 150, which will be described hereinafter.

The first filter frame 130 may further include the first filter support 135, which may upwardly extend toward the second frame 132 from the first frame 131. The first and second frames 131 and 132 may be spaced apart from each other by the first filter support 135. A plurality of the first filter support 135 may be provided, and the plurality of first filter supports 135 may be arranged in the circumferential direction to be connected to rims of the first and second frames 131 and 132. The mounting space of the first filter 120 may be defined by the first and second frames 131 and 132 and the plurality of first filter supports 135.

A sensor device or sensor 137 may be installed or provided at the first filter frame 130. The sensor 137 may include a dust sensor that senses an amount of dust in the air and a gas sensor that senses an amount of gas in the air. The dust sensor and the gas sensor may be supported by the second frame 132 of the first filter frame 130.

The first filter 120 may be separably mounted in the mounting space. The first filter 120 may have a cylindrical shape, and air may be introduced into the first filter 120 through the outer circumferential surface of the first filter 120. Impurities, such as dust, in the air may be filtered while the air is passing through the first filter 120.

As the first filter 120 has a cylindrical shape, air may be introduced into the first filter 120 in any direction, based on the first filter 120. Thus, a filtering area of air may be increased.

The mounting space may be formed in a cylindrical shape, corresponding to a shape of the first filter 120. In a mounting process of the first filter 120, the first filter 120 may be slidingly inserted in the radial direction. In contrast, in a separation process of the first filter 120, the first filter 120 may be slidingly extracted to the outside in the radial direction from the mounting space.

In other words, if the first and second handles 141 and 144 are manipulated in a state in which the first filter 120 is placed on an upper surface of the support 140, the first filter 120 may be located at a released position while moving downwardly. Also, the first filter 120 may be slid to the outside in the radial direction, to be separated from the mounting space.

On the other hand, in the state in which the first filter 120 is separated from the mounting space, the first filter 120 may be slid to the inside in the radial direction toward the mounting space to be supported by the upper surface of the support 140, and be upwardly adhered closely by the first and second handles 141 and 144. At this time, the first filter 120 may be located at a coupling position in the first blower 100. A first support cover 136 may be coupled to the outside of the first filter support 135.

The first blower 100 may further include the first fan housing 150 installed or provided at an exit side of the first filter 120. A housing space portion or space 152 having the first fan 160 accommodated therein may be formed in the first fan housing 150. The first fan housing 150 may be supported by the first filter frame 130.

A first fan introducing portion 151 that guides air to be introduced into the first fan housing 150 may be formed at a lower part or portion of the first fan housing 150. A grill may be provided in or at the first fan introducing portion 151, to prevent a finger, for example, of a user from being inserted inside the first fan housing 150 when the first filter 150 is separated.

The first blower 100 may further include an ionizer 158 that removes or sterilizes smell particles or odors in the air. The ionizer 158 may be coupled to the first fan housing 150 and be capable of acting on the air which flows into an inside portion of the first fan housing 150.

The sensor 137 and the ionizer 158 may also be installed or provided in the second blower 200, which is described hereinafter. For example, the sensor 137 and the ionizer 158 may be installed or provided in one of the first blower 100 or the second blower 200.

The first fan 160 may be placed or located on or at an upper side of the first fan introducing portion 151, and may be accommodated in the housing space 152 of the first fan housing 150. For example, the first fan 160 may include a centrifugal fan which introduces air in the axial direction and discharges the air to an upper side in the radial direction.

The first blower 100 may further include the first air guide 170 which guides a flow of air which passes through the first fan 160 by being coupled to an upper side of the first fan 160. The air guide 170 may include an outside wall 171 having a cylindrical shape, and an inside wall 172 which is positioned at an inside of the outside wall 171 and has a cylindrical shape. The outside wall 171 may surround the inside wall 172. A first air flow path through which air may flow may be formed between an inner circumferential surface of the outside wall 171 and an outer circumferential surface of the inside wall 172.

The first air guide 170 may include a guide rib 175 which may be disposed or provided in the first air flow path. The guide rib 175 may extend from the outer circumferential surface of the inside wall 172 to the inner circumferential surface of the outside wall 171. A plurality of guide ribs 175 may be spaced apart from each other. The plurality of guide ribs 175 may perform a function of guiding the air introduced to the first air flow path of the first air guide 170 via the first fan 160 in the upward direction.

The first air guide 170 may further include a motor accommodating portion 173 which extends from the inside wall 172 to a lower side and thus accommodates a first fan motor 165. The motor accommodating portion 173 may have a bowl shape a diameter of which may be gradually reduced in a downward direction.

The first fan motor 165 may be supported to or at an upper side of the motor accommodating portion 173. A rotational shaft 165a of the first fan motor 165 may extend from the first fan motor 165 in the downward direction and be coupled to a shaft coupling portion 161a of the hub 161 through the lower surface portion of the motor accommodating portion 173.

In addition, a motor coupling portion 166 may be provided on or at an upper side of the first fan motor 165. The motor coupling portion 166 may guide the first fan motor 165 to be fixed to the air guide 170.

Figure 9:
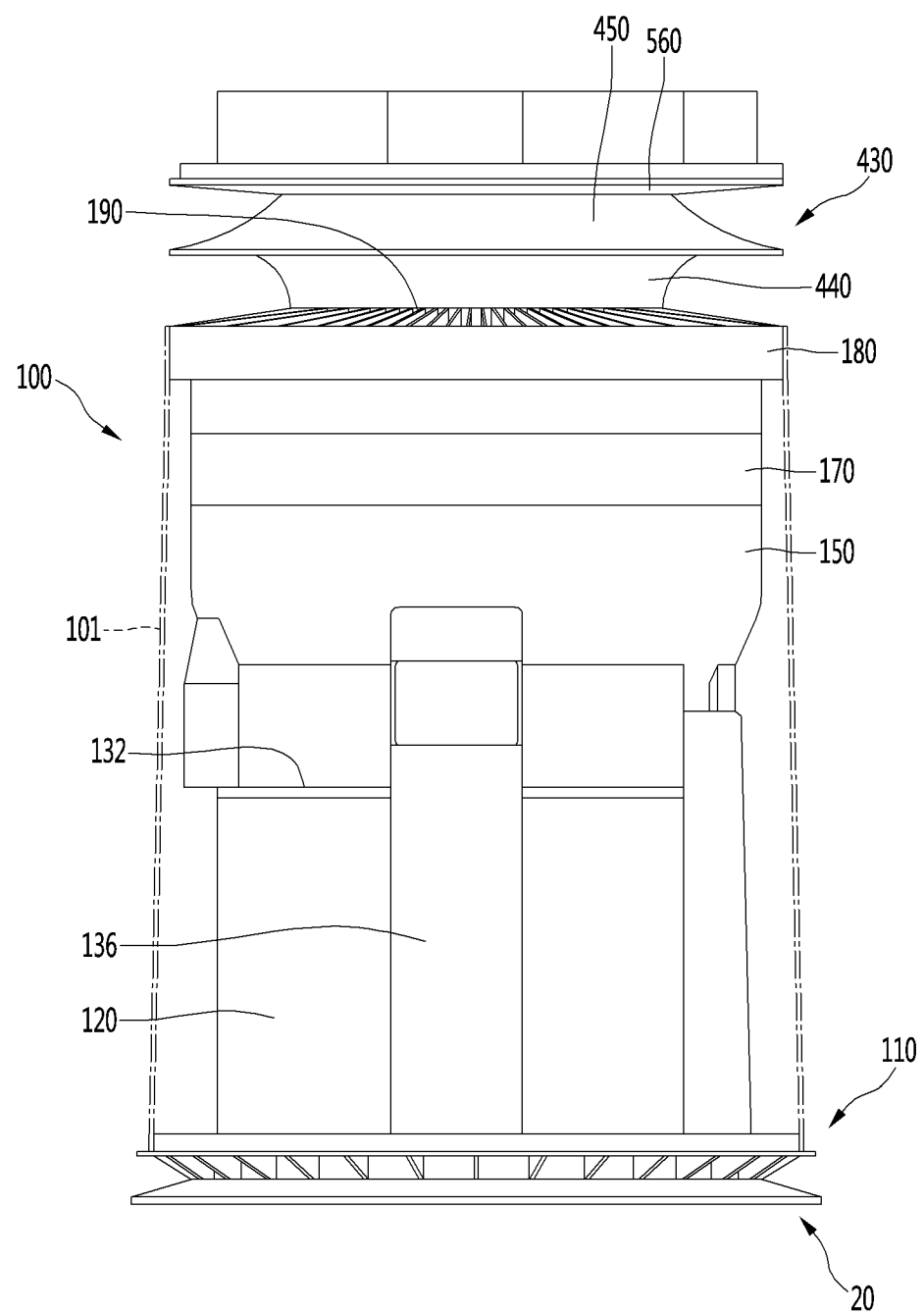
FIG. 9 is a view illustrating a partial configuration of the air cleaner according to an embodiment.
Figure 10:
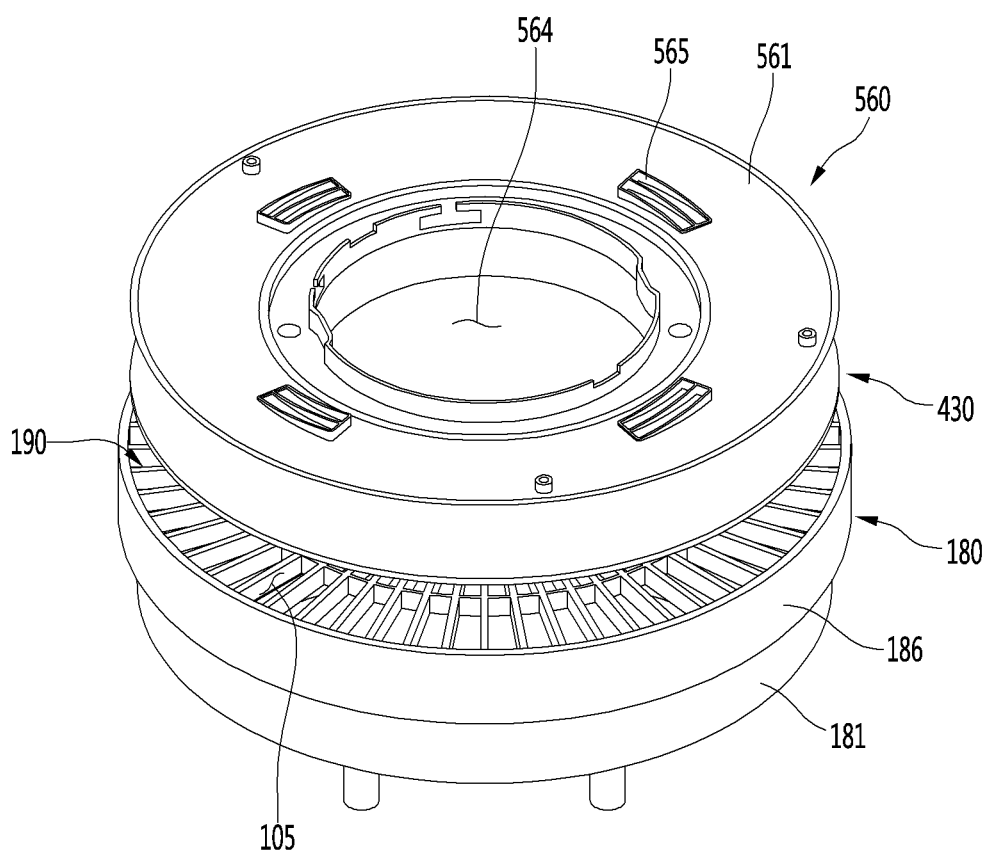
FIG. 10 is a perspective view illustrating a dividing plate and a configuration coupled to the dividing plate according to an embodiment.
Figure 11:
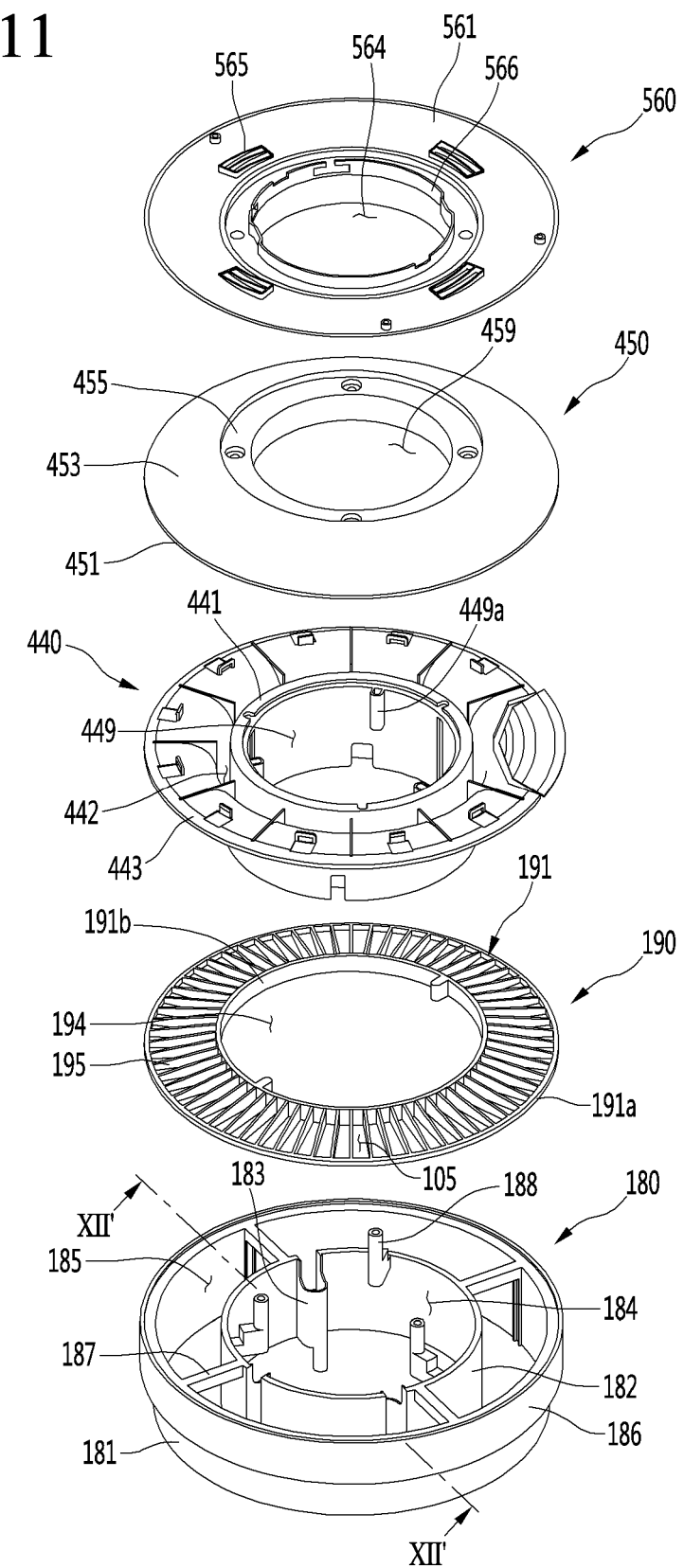
FIG. 11 is an exploded perspective view illustrating the dividing plate and the configuration coupled to the dividing plate according to an embodiment.
Figure 12:
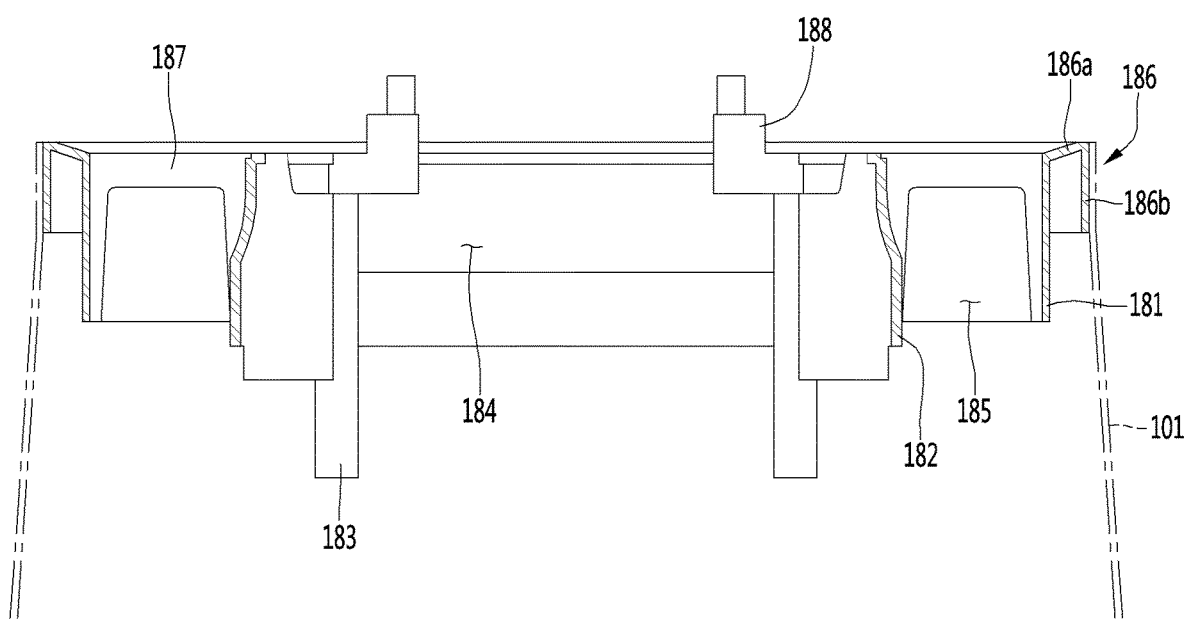
FIG. 12 is a sectional view, taken along line XII-XII' of FIG. 11.

FIG. 9 is a view illustrating a partial configuration of the air cleaner according to an embodiment. FIG. 10 is a perspective view illustrating a dividing plate and a configuration coupled to the dividing plate according to an embodiment. FIG. 11 is an exploded perspective view illustrating the dividing plate and the configuration coupled to the dividing plate according to an embodiment. FIG. 12 is a sectional view, taken along line XII-XII of FIG. 11.

Referring to FIGS. 9 to 12, the first blower 100 according to an embodiment may further include the second air guide 180 which may be coupled to an upper side of the air guide 170 and guide air which has passed through the first air guide 170 to the first discharge guide 190.

The second air guide 180 may include a first guide wall 181 which has a substantially cylindrical shape, and a second guide wall 182 which is positioned inside of the first guide wall 181 and has a substantially cylindrical shape. The first guide wall 181 may surround the second guide wall 182.

A second air flow path 185 may be formed, through which an air flow may be formed between an inner circumferential surface of the first guide wall 181 and an outer circumferential surface of the second guide wall 182. Air which flows along a first air flow path 172a of the first air guide 170 may flow in the upward direction through the second air flow path 185. The second air flow path 185 may be referred to as a "discharge flow path." In addition, the first discharge outlet 105 may be disposed or provided on or at an upper side of the second air flow 185.

A fastening guide 183, which may be coupled with the first air guide 170, may be provided on or at a lower portion of the second guide wall 182. The fastening guide 183 may extend to a lower side of the second guide wall 182.

A predetermined fastening member may be coupled to the fastening guide 183 and the fastening member may be coupled to a fastening rib 178 of the first air guide 170. The fastening rib 178 may project from an upper surface of the motor accommodating portion 173 in the upward direction. In addition, a plurality of the fastening guide 183 may be provided, and the plurality of fastening guides 183 may be spaced apart from each other in the circumferential direction. For example, three fastening guides 183 and three fastening ribs 178 may be provided.

The second air guide 180 may further include a wall supporting portion or support 187 which extends from the inner circumferential surface of the first guide wall 181 to the outer circumferential surface of the second guide wall 182. By the wall support 187, the first and second guide walls 181 and 182 may be stably coupled to each other. A plurality of wall supports 187 may be provided to be spaced apart from each other in the circumferential direction. For example, the plurality of wall supports 187 may include four wall supports 187 that extend in four directions; however, embodiments are not limited thereto. In addition, the first discharge guide 190 may be supported on the plurality of wall supports 187.

A first space portion or space 184 in which at least a portion of a PCB device or PCB 500 may be accommodated may be formed in or at an inside of the second guide wall 182 having a cylindrical shape.

The second air guide 180 may further include a second coupling portion 188 which may be provided at an inner circumferential surface of the second guide wall 182 to be coupled to the dividing plate 430. The dividing plate 430 may include a first coupling portion 449a coupled to the second coupling portion 188.

A plurality of the second coupling portion 188 may be provided, and the plurality of second coupling portions 188 may be spaced apart from each other in the circumferential direction. For example, three second coupling portions 188 and three first coupling portions 449a may be provided; however, embodiments are not limited thereto.

The second air guide 180 may further include a bending portion 186 which may be bent outwards from an outer circumferential surface of the second air guide 180. The bending portion 186 may extend outward from an upper part or portion of the first guide wall 181. The bending portion 186 may form a rim part or rim of the second air guide 180, and form an outermost part or portion of the second air guide 180.

The bending portion 186 may extend to the outside in the radial direction from an upper end of the first guide wall 181 and be bent downwardly. For example, the bending portion 186 may have a substantially "¬" shape or eave shape.

The bending portion 186 may include a first extension portion or extension 186a which may extend to the outside in the radial direction from the first guide wall 181 and a second extension portion or extension 186b which may extend downwardly from the first extension 186a. The first extension 186*a* may be understood as a portion that supports a rim of the first discharge guide 190, that is, a bending supporting portion or support 197, and the second extension 186*b* may be understood as a portion that supports an inner surface of the first case 101.

The first blower 100 may further include the first discharge guide 190, which may be disposed or provided on or at the upper side of the second air guide 180, that is, an outlet side of air flow passing through the second air guide 180 relative to the air flow and guide the air discharge to the outside portion of the air cleaner 10. That is, the second air guide 180 may be disposed or provided at a suction side of the first discharge guide 190.

The first discharge guide 190 may include a first discharge main body 191 which forms a second space portion or space 194 at a substantially central portion. The first discharge main body 191 may include a main body outer wall 191*a* which forms an outer circumferential surface thereof and a main body inner wall 191*b* which forms an inner circumferential surface thereof. The main body outer wall 191*a* may surround the main body inner wall 191*b*. By the configuration of the main body outer wall 191*a* and the main body inner wall 191*b*, the first discharge main body 191 may have an annular shape.

The second space 194 may be formed on or at an inside of the main body inner wall 191*b*. At least a portion of the PCB 500 may be accommodated in the second space 194. The second space 194 may be formed on or at an upper side of the first space 184, and the first space 184 and the second space 194 may form an installation space portion or space in which the PCB 500 may be installed or provided.

The first discharge main body 191 may include the first discharge grill 195. The first discharge grill 195 may extend to the outside in the radial direction toward the main body outer wall 191*a* from the main body inner wall 191*b*.

In addition, a plurality of the first discharge grill 195 may be provided, and the first discharge outlet 105, through which air may be discharged to the outside, may be formed between the plurality of first discharge grills 195. The plurality of first discharge grills 195 may be disposed or provided on or at an upper side of the second air flow path 185, and air passing through the second air flow path 185 may be discharged through the first discharge outlet 105 while flowing toward the first discharge grill 195. An air flow path formed from the second air flow path 185 to the first discharge outlet 105 may be referred to as a "discharge flow path."

The second blower 200 may include a supporting device or support that supports a lower portion of the second filter 220 and a lever device which may be provided on or at a lower side of the support. The support and the lever may have a same configuration as the support 140 and the lever 142, which may be provided in the first blower 100, and therefore, a description regarding the support and the lever may be the same as the description of the support 140 and the lever 142.

The second blower 200 may further include a lever supporting device or support 560 that supports the second filter 220 or the lever of the second blower 200. The lever support 560 may have a substantially annular shape. The lever support 560 may include a third space portion or space 564 that defines an installation space in which the PCB 500 may be located or provided. The third space 564 may be formed at a substantially center portion of the lever support 560 by passing through the lever support 560 in the vertical direction.

The lever support 560 may include a lever support main body 561, which may have an annular shape. The lever support main body 561 may extend toward an outer circumferential surface from an inner circumferential surface thereof to be slightly inclined in the upward direction relative to the axial direction. That is, the surface forming the lever support main body 561 may form an inclined surface. A space between the inclined surface and the upper surface of the dividing plate 430, which is described hereinafter, provides a space portion or space in which a user's hand may be located or inserted.

The lever support main body 561 may be referred to as a "blocking portion" in that air which is discharged through the first discharge outlet 105 of the first blower 100 may be blocked from being introduced into the second blower 200.

The lever support 560 may further include a movement guide portion or guide 565 that protrudes from the lever support main body 561 in the upward direction. The movement guide 565 may have a same configuration as the movement guide 113 of the first blower 100, and therefore, a detail description may be the same as the description regarding the movement guide 113. For convenience of description, the movement guide 113 may be referred to as a "first movement guide," and the movement guide 565 may be referred to as a "second movement guide."

The lever support 560 may further include a support projection 566 that protrudes from an inner circumferential surface of the lever support main body 561 in the upward direction. The support projection 566 may support the lever of the second blower 200.

The divider 400 may include the dividing plate 430 which separates or blocks an air flow generated from the first blower 100 and an air flow generated from the second blower 200. By the dividing plate 430, the first and second blowers 100 and 200 may be spaced apart from each other in the vertical direction. The dividing plate 430 may be disposed or provided between the first case 101 and the second case 201.

The air discharged from the first discharge outlet 105 may be guided by the dividing plate 430 to flow outside of the air cleaner 10. Accordingly, it is possible to prevent the air from being introduced to the second blower 200.

The dividing plate 430 may include a first plate 440 and a second plate 450 coupled to the first plate 440. The second plate 450 may be provided on or at an upper side of the first plate 440. In addition, the first plate 440 may extend to be rounded in the upward direction, and the second plate 450 may extend to be rounded in the downward direction.

The first plate 440 may include a plate inner wall 441 which has a substantially annular shape and a plate outer wall 443 which may surround the plate inner wall 441. A fourth space portion or space 449 that passes through the first plate 440 in the vertical direction may be formed at a center portion or center of the plate inner wall 441. The fourth space 449 may provide an installation space in which at least a portion of the PCB 500 may be located or provided.

The plate outer wall 443 may extend to the outside in the radial direction from the plate inner wall 441. In addition, the first plate 440 may further include a recessed portion or recess 442 which defines a space between the plate inner wall 441 and the plate outer wall 443. The recess 442 may be recessed downwardly from a space between an upper end part or portion of the plate inner wall 441 and an upper end part or portion of the plate outer wall 443.

The first plate 440 may further include the first coupling portion 449*a* which may be coupled to the second air guide 180. The first coupling portion 449*a* may be provided on or at an inner circumferential surface of the plate inner wall 441. In addition, the first coupling portion 449a may be coupled to the second coupling portion 188 of the second air guide 180. The second coupling portion 188 may be provided on an inner circumferential surface of the second guide wall 182.

The second plate 450 may include a second plate main body 451 which has a substantially annular shape. The second plate 450 may further include a plate mounting portion or mount 455 which may protrude to the inside in the radial direction from an inner circumferential surface of the second plate main body 451. The plate mount 455 may be depressed in the downward direction from an upper end portion or end of the second plate main body 451, and support the lever support 560.

A fifth space portion or space 459 may be formed at a center portion or center of the plate mount 455. The fifth space portion 459 provides an installation space in which at least a portion of the PCB 500 may be located or provided. The fifth space 459 may be aligned on or at a lower side of the fourth space 564. The first to fifth spaces 184, 194, 564, 449, and 459 may be aligned in the vertical direction, to provide an installation space for the PCB 500.

The second plate main body 451 may extend at an incline toward the outside in the radial direction. The second plate main body 451 may include an inclined surface 453 which extends at an incline in the downward direction toward the outer circumferential surface from the inner circumferential surface of the second plate main body 451. For example, the inclined surface 453 may have a round surface which extends to be rounded.

Figure 13:
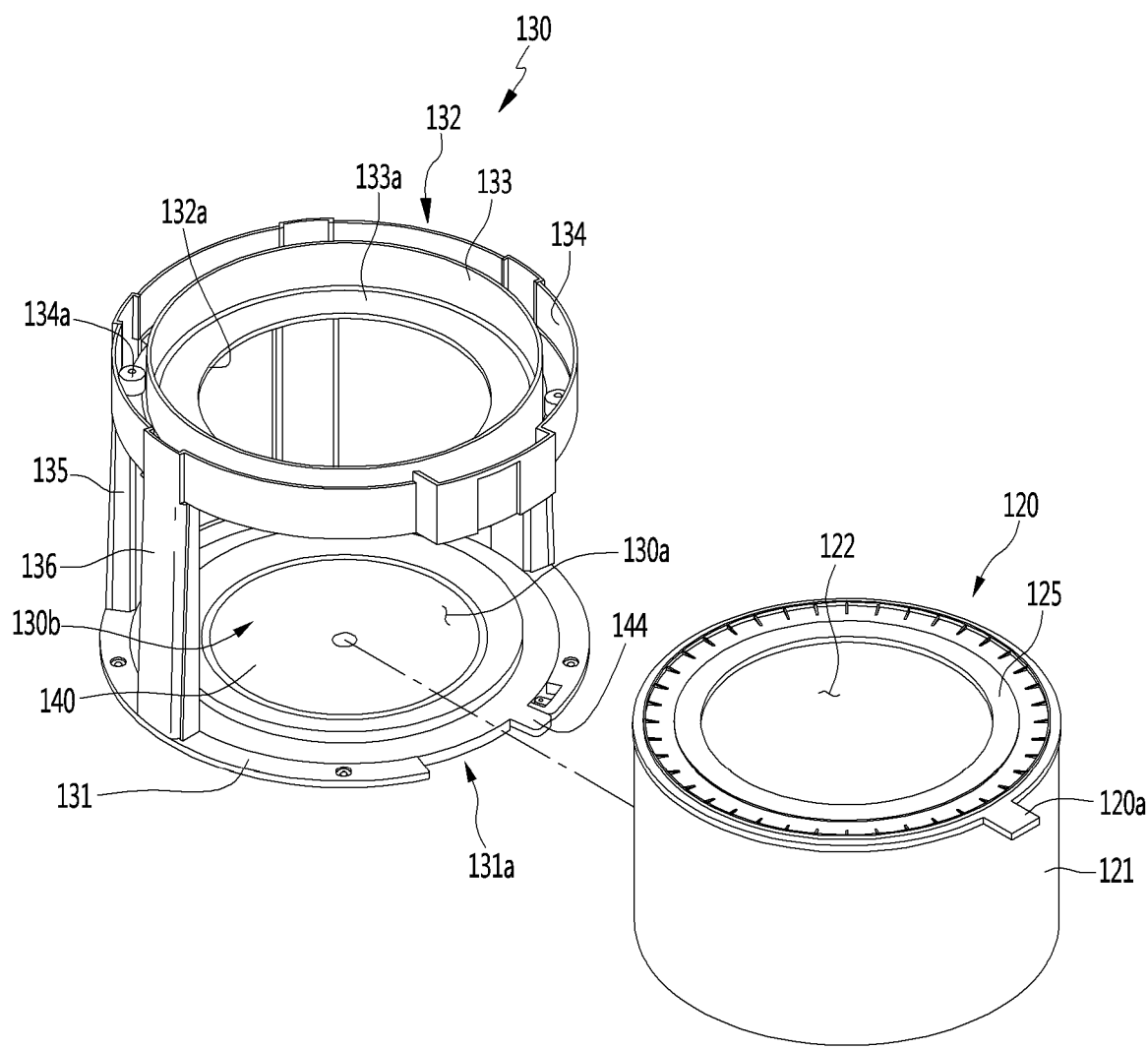
FIG. 13 is an exploded perspective view of a filter and a filter frame according to an embodiment.
Figure 14:
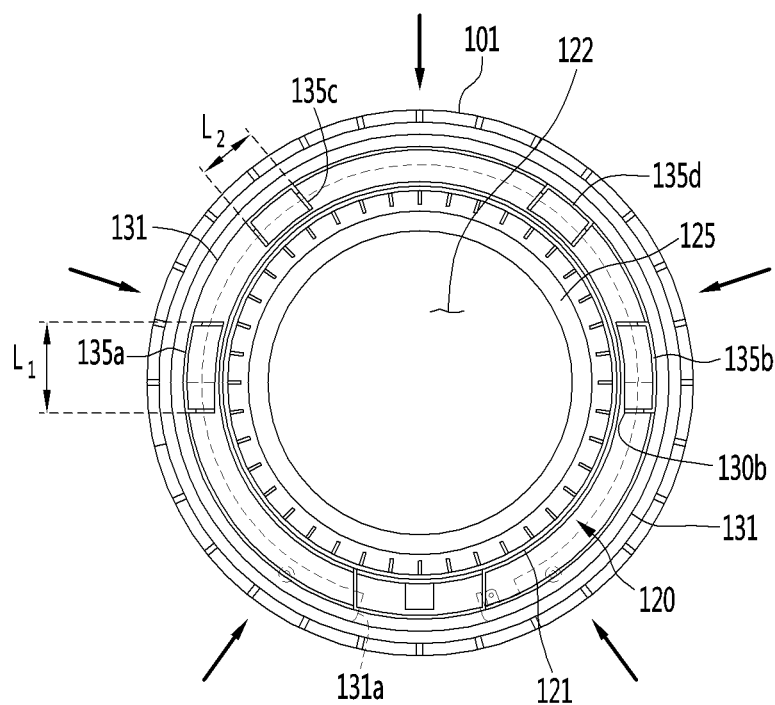
FIG. 14 is a schematic view illustrating an arrangement of the filter frame, the filter, and the case according to an embodiment.

FIG. 13 is an exploded perspective view of a filter and a filter frame according to an embodiment. FIG. 14 is a schematic view illustrating an arrangement of the filter frame, the filter, and the case according to an embodiment.

Referring to FIGS. 13 to 14, the first filter frame 130 according to an embodiment may further include lower frame 131 that forms a lower portion of the first filter frame 130, upper frame 132 which forms an upper portion of the first filter frame 130, and first filter support 135 which extends in the upward direction toward the upper frame 132 from the lower frame 131. A plurality of the first filter support 135 may be provided. The first filter support 135 may be referred to as a "support frame" in that the first filter support 135 supports an outer surface of the first filter 120.

A mounting space 130a in which the first filter 120 may be located or provided may be formed by the lower and upper frames 131 and 132 and the plurality of first filter supports 135. The mounting space 130a may have a cylindrical shape corresponding to a shape of the first filter 120.

The lower frame 131 may have a ring shape to surround the lower portion of the first filter 120. The lower frame 131 may include frame cut-out 131a which has a shape formed by cutting out at least a portion of the lower frame 131. The frame cut-out 131a forms a space in which the handle 144 of the lever 142 may be located, and may be formed to have a size corresponding to a rotational path of the handle 144. In other words, the frame cut-out 131a may provide a space in which the handle 144 may be movable.

The upper frame 132 may have a ring shape to surround an upper portion of the first filter 120, and may be located to be spaced apart from the lower frame 131 in the upward direction. In addition, the ring-shape inner portion space of the upper frame 132 may form a frame opening portion or opening 132a. The frame opening 132a may communicate with the filter hole 122 of the first filter 120.

The upper frame 132 may include frame inner wall 133 and frame outer wall 134 which surrounds the frame inner wall 133. Each of the frame inner wall 133 and the frame outer wall 134 may have a ring shape. In addition, the frame opening 132a may be understood as an inside space of the frame inner wall 133.

An inner circumferential surface of the frame outer wall 134 may be spaced apart from an outer circumferential surface of the frame inner wall 133. The upper frame 132 may include a wall connecting portion 134a which extends to a lower portion of the frame inner wall 133 from a lower portion of the frame outer wall 134.

The upper frame 132 may include a housing mounting portion or mount 133a which protrudes from the inner circumferential surface of the frame inner wall 133 to support the first fan housing 150. An inside space of the housing mount 133a may form the frame opening 132a.

The plurality of first filter supports 135 may be arrayed in the circumferential direction along the rim of the lower and upper frames 131 and 132, to support the outer circumferential surface of the first filter 120. For example, the plurality of first filter supports 135 may be disposed or provided at a rear portion of the first filter frame 130. In addition, an insertion portion 130b, which provides a space into or from which the first filter 120 may be inserted or withdrawn, may be formed at a front portion of the first filter frame 130.

Directions will be defined. The direction in which the first filter 120 is withdrawn may be defined as a "front" of the first filter frame 130, and the direction in which the first filter 120 is inserted may be defined as a "rear" of the first filter frame 130. The frame cut-out 131a may be formed at a front portion or front of the lower frame 131, relative to a shape of the lower frame 131.

In other words, the insertion portion 130b may be formed in a space which is formed at the front of the first filter frame 130 in a space between two first filter supports 135 among the plurality of first filter supports 135. The two first filter supports 135 may include first frames 135a and 135b. The first frames 135a and 135b may be disposed opposite to each other.

Second frames 135c and 135d may be disposed or provided in the circumferential direction in a space which is formed at the rear of the first filter frame 130 in a space between the first frames 135a and 135b. A plurality of second frames 135c and 135d may be provided.

An insertion portion 130b from or into which the first filter 120 may be withdrawn or inserted may be formed in a front space in the space between the two first frames 135a and 135b, and the second frames 135c and 135d may be disposed in a rear space.

When considering a supporting force of the first filter frame 130, a supporting force of the front portion of the first filter frame 130, at which the insertion portion 130b is formed, may be smaller than a supporting force of the rear portion at which the second frames 135c and 135d are disposed or provided. In this embodiment, the first frames 135a and 135b may be formed larger than the second frames 135c and 135d so as to reinforce the supporting force of the front portion, which is relatively small.

A length L1 in the circumferential direction of the first frames 135a and 135b may be longer than a length L2 in the circumferential direction of the second frames 135c and 135d. According to this configuration, the supporting force of the first frames 135a and 135b may be greater than the supporting force of the second frames 135c and 135d. Thus, it is possible to reinforce a supporting force which may be insufficient as no separate frame is provided at the front portion of the first filter frame 130.

The first case 101 may surround the first filter 120. In addition, the first case 101 may be provided at the outside of the first filter frame 130. That is, the first case 101 may surround the lower frame 131, the upper frame 132, and the first filter support 135.

If the first case 101 is separated, that is, if the first and second parts 101a and 101b of the first case 101 are separated from each other, the first filter 120 and the first filter frame 130 may be exposed to the outside. In addition, the first filter 120 may be separated to the outside in the radial direction through the insertion portion 130b, or be mounted in the mounting space 130a by moving to the inside in the radial direction through the insertion portion 130b.

If the first fan 160 is driven, air may be suctioned in the radial direction through the first suction inlet 102 of the first case 101, and flow into the first filter 120 supported by the first filter frame 130. According to the above-described configuration, air may be suctioned in the circumferential direction of the air cleaner 10, that is, 360-degree directions, so that the suction capacity of the air cleaner 10 may be increased. In addition, the plurality of first filter supports 135 spaced apart from each other are provided at the first filter frame 130, so that it is possible to prevent the plurality of first filter supports 135 from interfering with the flow of suctioned air.

FIG. 13 illustrates a state in which the first filter member 120 is separated. In this state, the handle 144 of the lever 142 may be located at a released position of the first filter 120, that is, one end portion or end of the frame cut-out 131a. At this time, the position of the handle 144 may be referred to as a "first position" or "released position."

When the handle 144 is located at the first position, the support is in a state in which it is moved in the downward direction. Thus, the mounting space 130a forms a space sufficiently large enough for the first filter 120 to be inserted.

In the state of FIG. 13, the first filter 120 may be mounted in the mounting space 130a by being moved to the rear through the insertion portion 130b. In addition, the support 140 may be moved in the upward direction by rotating the handle 144 in one direction. For example, the handle 144 may be rotated in the clockwise direction, relative to FIG. 13.

If the support 140 is moved in the upward direction, the first filter 120 may be adhered closely to the upper portion of the first filter frame 130, that is, the upper frame 132 by being moved in the upward direction. Thus, the first filter 120 may be located at a coupling position.

The support 140 may be moved in the downward direction by rotating the handle 144 in the opposite direction in the state in which the first filter 120 is mounted in the mounting space 130a. For example, the handle 144 may be rotated in the counterclockwise direction, relative to FIG. 13. If the support 140 is moved in the downward direction, the first filter 120 may be located at a position at which it is separable from the mounting space 130a.

A configuration of the second blower 200 will be described with reference to FIGS. 2 and 7.

The second blower 200 may include a lever and a support, which are provided on the upper side of the lever support 560. The configuration of the lever and the support may be similar to the configuration of the lever 142 and the support 140 of the first blower 100, and therefore, a description regarding the lever and the support may be the same as the description regarding the first blower 100.

The second blower 200 may further include a third air guide device or guide 270 which may be coupled to an upper side of the second fan 260 to guide flow of air passing through the second fan 260. The configuration of the third air guide 270 may be similar to the configuration of the first air guide 170, and therefore, a detail description may be the same as the description regarding the first air guide 170.

The third air guide 270 may include a guide device or guide that guides movement of the air flow controller 300. The guide may include a first rack and a shaft guide groove.

The second blower 200 may include a second discharge guide device or guide 280, which may be disposed or provided on or at an upper side of the third air guide 270 and guide the flow of air passing through the third air guide 270.

The air flow controller 300 may be movably provided on or at the upper side of the second discharge guide 280. The air flow controller 300 may include a third fan 330. The third fan 330 may guide air passing through the third air guide 270 to be discharged outside of the air cleaner 10. A third fan motor 335 may be coupled to the third fan 330.

The third fan 330 may include an axial flow fan. The third fan 330 may be operated to allow air introduced in the axial direction by passing through the third air guide 270 to be discharged in the axial direction. The air passing through the third fan 330 may be discharged to the outside through the second discharge outlet 305, which may be located on or at an upper side of the third fan 330. In the air cleaner 10, a discharged blowing amount may be improved, and air may be discharged in various directions as the second discharge outlet 305 along with the first discharge outlet 105 of the first blower 100 is provided.

The display 600 which displays operation information of the air cleaner 10 may be provided on or at the upper surface of the air cleaner 10. The display 600 may include a display PCB 618. The display PCB 618 may be installed or provided in a space between the upper surface of the air cleaner 10 and the third fan 330.

The first fan motor 165 and the second fan motor 265 may be disposed or provided in series relative to a longitudinal direction of the air cleaner 10. In addition, the second fan motor 265 and the third fan motor 335 may be disposed or provided in series relative to the longitudinal direction of the air cleaner 10. That is, the first to third fan motors 165, 265, and 365 may be located on or along a same axial line.

The air flow controller 300 may further include a rotational guide device or guide that guides rotation in a lateral direction of the air flow controller 300 and rotation in the vertical direction of the air flow controller 300. The rotation in the lateral direction may be referred to as "first direction rotation" and the rotation in the vertical direction may be referred to as "second direction rotation."

The rotational guide may include a first guide mechanism or guide that guides the first direction rotation of the air flow controller 300 and a second guide mechanism or guide that guides the second direction rotation of the air flow controller 300. The first guide may include a first gear motor 363 that generates a drive force and a first gear 360 which is rotatably coupled to the first gear motor 363. For example, the first gear motor 363 may include a step motor a rotation angle of which may be easily controlled.

The second guide may include a rotation guide member or guide 370 (see FIG. 16) that guides the second direction rotation of the air flow controller 300. The rotation guide 370 may include a rack 374.

The second guide may include a second gear motor 367 that generates a drive force and a second gear 365 which is coupled to the second gear motor 367. For example, the second gear motor 367 may include a step motor. If the second gear motor 367 is driven, the rotation guide 370 is rotated in the vertical direction by linkage of the second gear 365 and the second rack 374. Accordingly, the air flow controller 300 performs the second direction rotation according to a movement of the rotation guide 370.

If the air flow controller 300 performs the second direction rotation, the air flow controller 300 may be in a "second position" in which it protrudes from the upper surface of the air cleaner 10 (see FIG. 17). On the other hand, as shown in FIG. 16, a position in which the air flow controller 300 is laid out may be referred to as a "first position."

Figure 15:
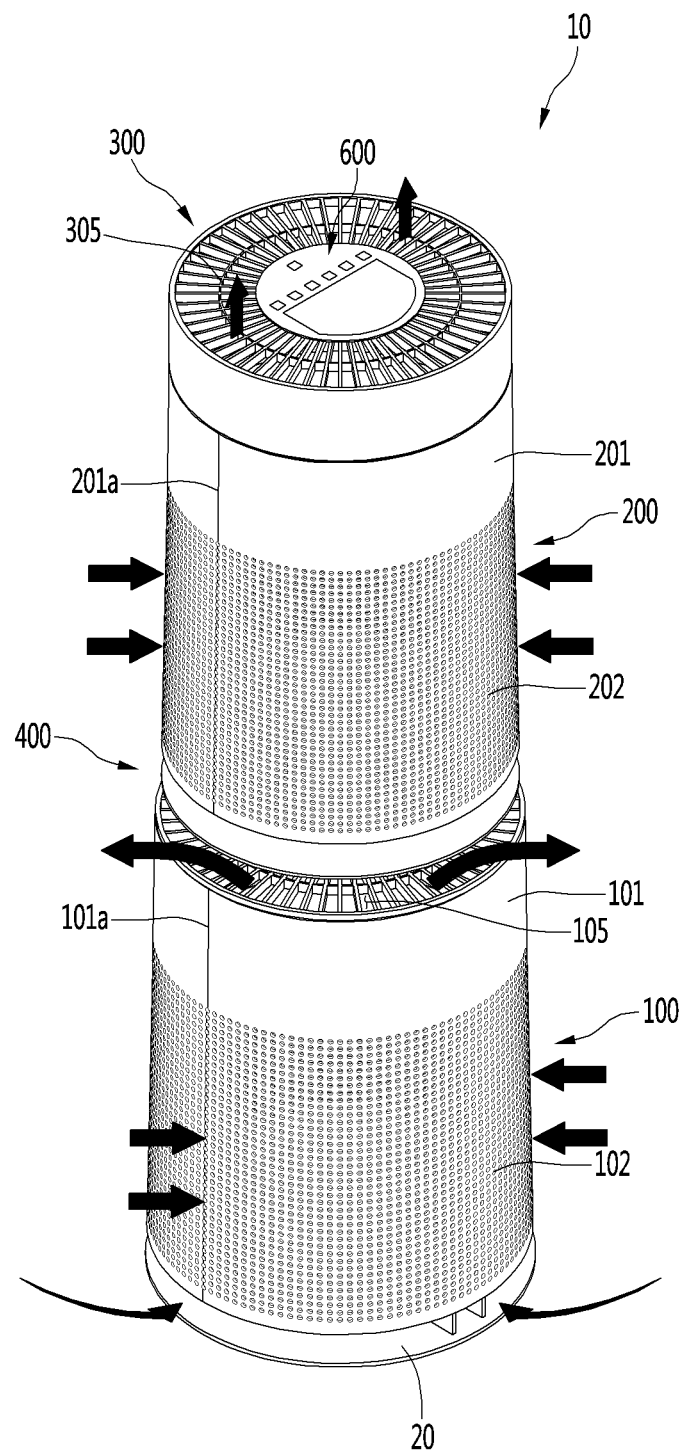
FIGS. 15 to 17 are views illustrating a state in which air flows in the air cleaner according to an embodiment.
Figure 16:
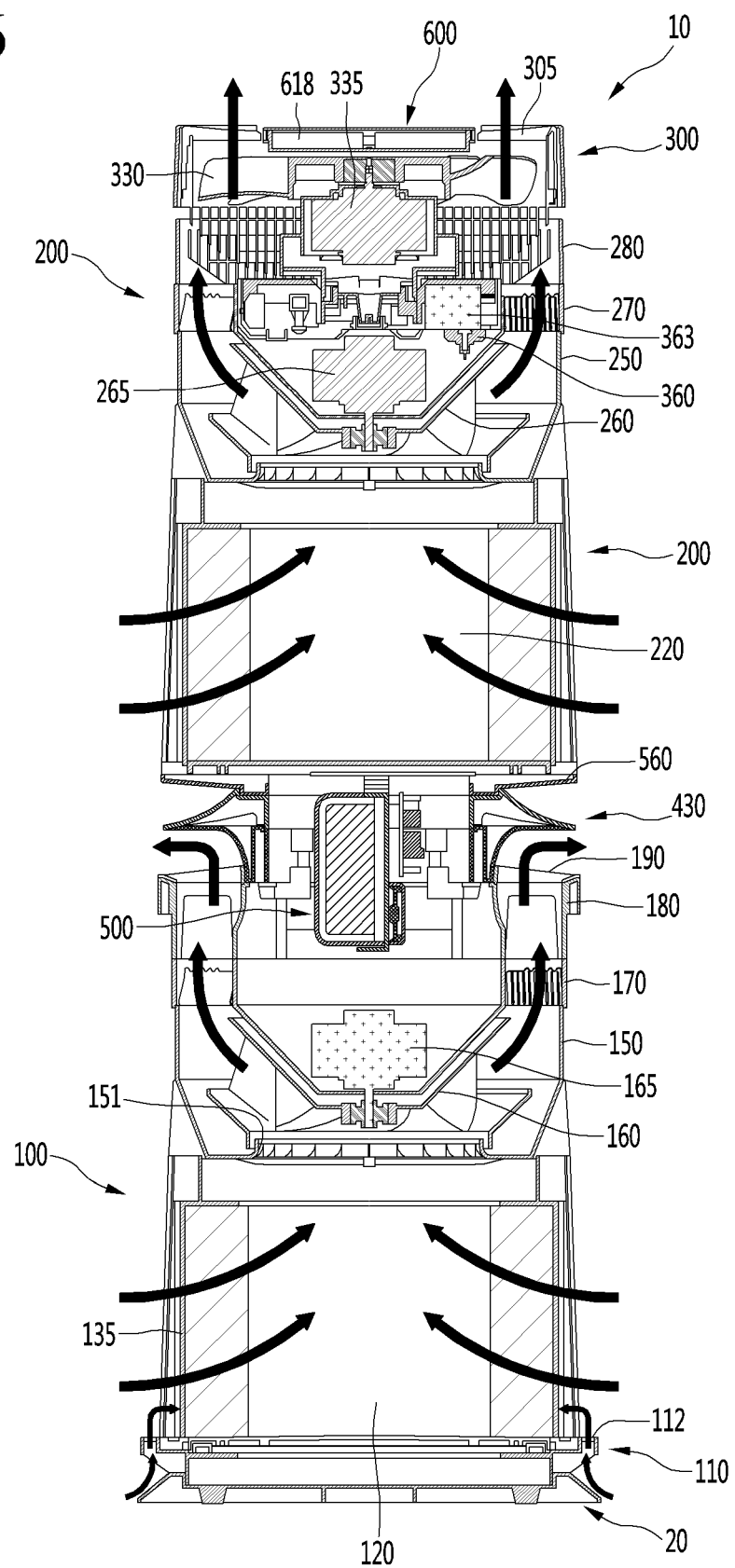

FIGS. 15 to 17 are views illustrating a state in which air flows in the air cleaner according to an embodiment. The flow of air according to the embodiment will be briefly described with reference to FIGS. 15 to 17.

First, the flow of air according to driving of the first blower 100 will be described. If the first fan 160 is driven, indoor air is suctioned into the first case 101 through the first suction inlet 102 and the base suction inlet 103. The suctioned air passes through the first filter 120, and foreign materials in the air may be filtered in this process. In the process in which the air passes through the first filter 120, the air is suctioned in the radial direction of the first filter 120, is filtered, and then flows in the upward direction.

The air which has passed through the first filter 120 flows to the upper side in the radial direction while passing through the first fan 160 and stable flows in the upward direction while passing through the first air guide 170 and the second air guide 180. Air passing through the first air guide 170 and the second air guide 180 passes by the first discharge guide 190 and flows in the upward direction through the first discharge outlet 105. Air which is discharged through the first discharge outlet 105 is guided by the dividing plate 430 which is positioned at the upper side of the first discharge guide 190, and thus, is discharged to the outside of the air cleaner 10.

In the second fan 260 is driven, indoor air is suctioned into the second case 201 through the second suction inlet 202 and the base suction inlet 103. The suctioned air passes through the second filter 220, and foreign materials in the air may be filtered in this process. In a process in which the air passes through the second filter 220, the air is suctioned in the radial direction of the second filter 220, is filtered, and then flows in the upward direction.

Air which has passed through the second filter 220 flows to the upper side in the radial direction while passing through the second fan 160, and stably flows in the upward direction while passing through the third air guide 270 and the second discharge guide 280. Air which has passed through the third air guide 270 and the second discharge guide 280 may be discharged through the second discharge outlet 305 via the air flow controller 300.

At this time, if the air flow controller 300 is in the first position in which the air flow controller 300 is laid out, as shown in FIGS. 15 and 16, air which is discharged from the air flow controller 300 flows in the upward direction. On the other hand, if the air flow controller 300 is in the second position in which the air flowing controller 300 is erected, as shown in FIG. 17, air which is discharged from the air flow controller 300 may flow toward the front upper side. By the air flow controller 300, an amount of air which is discharged from the air cleaner 10 may be increased, and purified air may be supplied to a position far away from the air cleaner 10.

Embodiments disclosed herein provide an air cleaner which is capable of improving a suction capacity of air which is suctioned into the air cleaner. Embodiments disclosed herein also provide an air cleaner that may include an air suction flow path formed in the radial direction toward the inside of the air cleaner from the circumferential direction of the air cleaner and a suction flow path through which air may be introduced into the air cleaner through upper and lower portions of the air cleaner, so that air around a person in a room may be sufficiently suctioned whether the person in the room is sitting down or standing up.

Embodiments disclosed herein further provide an air cleaner which enables air discharged therefrom to be discharged in various directions and reach or extend a long distance. More particularly, embodiments disclosed herein provide an air cleaner in which a discharged air current may be easily generated toward upper, front, left, and right or lateral directions about the air cleaner, so that air may be easily discharged toward a peripheral space of a person whether the person in a room sitting down or standing up.

Embodiments disclosed herein additionally provide an air cleaner which enables cases forming an outer appearance of the air cleaner to be easily assembled or disassembled. Embodiments disclosed herein provide an air cleaner a blowing capacity of which may be increased.

Embodiments disclosed herein also provide an air cleaner which improves a purification capacity of a filter and in which replacement of the filter may be easily performed. In particular, embodiments disclosed herein provide an air cleaner which includes a filter which may be easily detachable from an inside of a cylindrical case.

Embodiments disclosed herein provide an air cleaner which includes a filter that facilitates suction of air in the radial direction and a case that shields the filter. Embodiments disclosed herein provide an air cleaner which enables a filter to be easily installed without separately providing an installation space for installing the filter in the air cleaner.

Embodiments disclosed herein provide an air cleaner that may include a main body portion or body, and a cylindrical case having a suction portion or inlet coupled to an outside of the main body portion, the suction portion enabling air to be suctioned toward a filter member or filter. The main body portion may include a cylindrical filter member or filter, and a filter frame that forms a mounting space of the filter member, so that air may be suctioned in 360-degree directions. If the cylindrical case is opened, the filter member may be extracted to the outside in a radial direction from the mounting space, thereby facilitating attachment/detachment of the filter member.

The air cleaner may further include a case supporting portion or support provided at a lower side of the cylindrical case. The case supporting portion may include a grill insertion portion into which a supporting projection of the cylindrical case may be inserted, so that the cylindrical case may be stably supported.

The case supporting portion may include a suction grill having a plurality of suction holes, and the grill insertion portion may be formed between the plurality of suction holes, so that space utilization of the air cleaner may be excellent. The supporting projection may protrude from an inner circumferential surface of the cylindrical case, so that coupling of the supporting projection to the grill insertion portion may be easily performed.

The air cleaner may further include a magnet member or magnet provided to or at any one of the main body portion or the cylindrical case and a metal piece provided to or at the other of the main body portion or the cylindrical case. The metal piece may be separately coupled to the magnet member, so that coupling of the cylindrical case to the main body portion may be stably performed. The metal member or the metal piece may be located at an upper part or portion of the cylindrical case.

The filter frame may include a lower frame provided at a lower part or portion of the filter member; an upper frame provided at an upper part or portion of the filter member; and a plurality of supporting frames that extends toward the upper frame from the lower frame. An insertion portion for inserting or extracting the filter member may be formed between the plurality of supporting frames. The suction portion may include a plurality of through holes. A size of a through hole formed at a lower part or portion of the suction portion among the plurality of through holes may be formed larger than a size of a through hole formed at an upper part or portion of the suction portion among the plurality of through holes.

The cylindrical case may be disposed or provided to surround the filter member and the filter frame. The cylindrical case may include a first case and a second case. The air cleaner may further include a dividing plate disposed or provided between the first case and the second case.

A first filter member or filter and a first filter frame may be disposed or provided at an inside of the first case. A second filter member or filter and a second filter frame may be disposed or provided at an inside of the second case. The air cleaner may further include a first fan disposed or provided at an exit side of the first filter member and a second fan disposed or provided at an exit side of the second filter member.

Embodiments disclosed herein further provide an air cleaner that may include a main body portion or body having a filter member or filter, and a cylindrical case disposed or provided to surround the main body portion. The cylindrical case may have a suction portion or inlet through which air may be suctioned in a radial direction toward the main body portion. The cylindrical case may be separably provided to the main body portion. If the cylindrical case is separated, the filter member may be slidingly extracted to the outside in the radial direction.

As the suction portion may be formed along an outer circumferential surface of the cylindrical case, and air may be suctioned in the radial direction through the suction portion, a suction capacity may be improved, and a structural resistance of the case may not be generated in an air suction process. In particular, a plurality of apertures may be included on the suction portion and a suction flow path which is directed to the inside portion of the air cleaner may be formed in 360-degree directions relative to the air cleaner, as the plurality of apertures may be formed evenly over an entire outer circumferential surface of the case. Finally, a suction area of air may be increased and air around a person in a room may be sufficiently suctioned whether a person in a room is sitting down or standing up.

In addition, the suction portion may include a first suction portion or inlet provided to or at a first case, a third suction portion or inlet provided to or at a second case, and a second suction portion or inlet provided at a base, to be formed long in an axial direction from a lower part or portion to an upper part or portion of the case. Thus, based on the air cleaner, air that exists at a lower part or portion of an indoor space and air that exists at a relatively high position of the indoor space may be suctioned into the air cleaner, thereby increasing a suction capacity of the air cleaner with respect to the indoor space.

Further, a second blowing device or blower may be disposed or provided at an upper side of a first blowing device or blower, a dividing plate may be provided between the first and second blowing devices, and air discharged from the first blowing device may be guided to the outside in the radial direction by the dividing plate. Thus, the air discharged from the first blowing device may be prevented from being again introduced into the second blowing device. In addition, a plurality of blowing devices may be provided, so that a blowing capacity of the air cleaner may be improved.

Furthermore, a filter member or filter may be formed in a cylindrical shape, so that air may be introduced into the filter member in overall directions at an outside of the filter member. Thus, a suction area of the air cleaner may be increased, and accordingly, an air cleaning ability of the filter may be improved.

Also, the filter member may be slid in the radial direction toward a filter frame. Thus, the filter member may be easily assembled or disassembled.

In addition, the filter member may be formed in a cylindrical shape, and a case may be formed in a shape surrounding the filter member. Thus, if the case is separated, the filter member may be exposed to the outside, so that a user may easily access the filter member.

The case and a main body portion or body of an air cleaning module may be separably coupled to each other, so that the case may be easily mounted or separated. In particular, the case and the main body portion may be coupled to each other by a magnetic force. For example, a magnet may be provided to or at any one of the case or the main body portion, and a metal member coupled to the magnet may be provided to or at the other of the case or the main body portion.

According to the above-described configuration, during an operation of the air cleaner, the case may be prevented from being separated from the main body portion by a magnetic force. When the main body portion is to be opened, the magnet and the metal member may be separated from each other, so that the case may be easily separated.

In addition, the case may be stably supported by a suction grill. In particular, a supporting projection may be provided at a lower part or portion of the case, and a grill insertion portion having the supporting projection inserted thereinto may be formed in the suction grill. The magnet or the metal member may be provided at an upper part or portion of the case.

According to the above-described configuration, when the case is to be separated from the main body portion, if a user releases the coupling between the magnet and the metal member and pulls the upper portion of the case, the upper portion of the case may be rotated about the lower portion of the case supported by the suction grill. The user may finally lift the case upwardly, so that the case may be easily separated without making any effort.

The details of one or more embodiments are set forth in the accompanying drawings and the description. Other features will be apparent from the description and drawings, and from the claims.

Although some embodiments are described for illustrative purposes, it will be apparent to those skilled in the art that various modifications and changes can be made thereto within the scope without departing from the essential features of the disclosure.

Accordingly, the embodiments should be construed not to limit the technical spirit but to be provided for illustrative purposes so that those skilled in the art can fully understand the spirit.

Embodiments should not be limited to the aforementioned embodiments but defined by appended claims. The technical spirit within the scope substantially identical with the scope will be considered to fall in the scope defined by the appended claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner, comprising:
a main body including a cylindrical filter and a fan housing in which a fan is accommodated, the fan being provided at an outlet side of the cylindrical filter;
a cylindrical case surrounding the main body, the cylindrical case including:
a first part configured to cover a portion of a circumferential surface of the fan housing and the cylindrical filter;
a second part being configured to cover another portion of the circumferential surface of the fan housing and the cylindrical filter; and
a separation portion formed at side end portions of the first part and the second part to be at a position where the first part and the second part are assembled or disassembled; and
a base placed on a ground and supporting a case support, the base being provided under the cylindrical case, wherein the case support supports lower portions of the first part and the second part, wherein when the first part and the second part cover the main body, the side ends of the first part and the side ends of the second part are disposed to face with each other at the separation portion, when an upper portion of at least one of the first part or the second part is pulled out of the main body, at least one of the first part or the second part rotates so as to be separated from the separation portion, and wherein the first part and the second part having a same shape are respectively rotated in an opposite direction to each other with respect to the case support so as to be separated.

2. The air cleaner of the claim 1, wherein both of the first part and the second part rotate with respect to lower portions of the first part and the second part and are separated from the separation portion when the upper portions of the first part and the second part are pulled out of the main body.

3. The air cleaner of the claim 2, wherein the cylindrical case includes a support projection disposed at lower portions of the first part and the second part, wherein the case support includes an insertion portion, and wherein the support projection is inserted into the insertion portion.

4. The air cleaner of the claim 2, further comprising:
a magnet provided in the main body; and
a magnet coupler provided at an inner surface of at least one of the first part or the second part, wherein the magnet coupler is separably coupled to the magnet.

5. The air cleaner of claim 3, wherein the support projection protrudes from an inner circumferential surface of the first part and the second part and is bent downward.

6. The air cleaner of claim 5, wherein the support projection includes:
a first projection extension that extends in a radial direction from the inner circumferential surface of the first part and the second part; and
a second projection extension that extends downwardly from the first projection extension.

7. The air cleaner of claim 6, wherein the second projection extension is inserted into the insertion portion and catches with the case support.

8. The air cleaner of claim 3, wherein the support projection includes a plurality of support projections arranged in a circumferential direction of the first part and the second part.

9. The air cleaner of claim 4, wherein the magnet coupler is provided at an inner circumferential surface of the first part and the second part, and wherein the magnet is provided at an outer circumferential surface of the main body.

10. The air cleaner of claim 1, further comprising:
a plurality of magnet couplers arranged in a circumferential direction of the cylindrical case so as to be spaced apart from each other; and
a plurality of magnets arranged in a circumferential direction of the main body so as to be spaced apart from each other.

11. The air cleaner of claim 9, wherein the coupling between the magnet coupler and the magnet is released when the upper portion of the case is pulled to an outside in a radial direction.

12. The air cleaner of claim 3, wherein the support projection is separated from the insertion portion when the cylindrical case is lifted upwardly so that the cylindrical case is separated from the main body.

13. The air cleaner of claim 12, wherein the cylindrical filter is located at a position at which the cylindrical filter is to be separated from the main body when the cylindrical case is separated from the main body.

14. The air cleaner of claim 13, further comprising a filter frame defining a mounting space of the filter, wherein the cylindrical filter frame includes:
a lower frame provided at an upper portion of the case support;
an upper frame spaced upwards from the lower frame; and
a plurality of supporting frames that connects the upper frame with the lower frame, the plurality of supporting frames being arranged in a circumferential direction of the cylindrical filter, and wherein an extraction portion is defined between two supporting frames among the plurality of supporting frames, to allow the cylindrical filter to be extracted from the mounting space.

15. The air cleaner of claim 4, wherein the main body includes an air guide disposed at an outlet side of the fan, the air guide including:
a cylindrical first guide wall;
a cylindrical second guide wall provided in the first guide wall; and an air flow path formed between an inner circumferential surface of the first guide wall and an outer circumferential surface of the second guide wall, wherein the magnet is disposed on the first guide wall.

16. The air cleaner of claim 1, wherein the first part has a semi-cylindrical shape or semi-cone shape.

17. The air cleaner of claim 1, wherein the second part has a semi-cylindrical shape or semi-cone shape.

* * * * *